(12) United States Patent
Ichida et al.

(10) Patent No.: US 10,293,880 B2
(45) Date of Patent: May 21, 2019

(54) BICYCLE SUSPENSION CONTROL APPARATUS

(75) Inventors: Tadashi Ichida, Osaka (JP); Hideki Ikemoto, Osaka (JP); Toyoto Shirai, Osaka (JP)

(73) Assignee: Shimano Inc., Osaka (JP)

( * ) Notice: Subject to any disclaimer, the term of this patent is extended or adjusted under 35 U.S.C. 154(b) by 577 days.

(21) Appl. No.: 13/370,517

(22) Filed: Feb. 10, 2012

(65) Prior Publication Data

US 2012/0221203 A1 Aug. 30, 2012

(30) Foreign Application Priority Data

Feb. 28, 2011 (JP) ................................. 2011-043068

(51) Int. Cl.
 *B62J 99/00* (2009.01)
 *B62K 25/04* (2006.01)
 *B62K 25/28* (2006.01)

(52) U.S. Cl.
 CPC .............. *B62K 25/04* (2013.01); *B62K 25/28* (2013.01); *B62J 2099/0013* (2013.01); *B62K 2025/044* (2013.01); *B62K 2025/047* (2013.01); *B62K 2025/048* (2013.01)

(58) Field of Classification Search
 CPC ................................................ B62K 2025/047
 USPC ........................................... 701/37; 280/283
 See application file for complete search history.

(56) References Cited

U.S. PATENT DOCUMENTS

| 482,696 | A | 9/1892 | Rckwell |
| 3,861,740 | A | 1/1975 | Tajima et al. |
| 6,050,583 | A | 4/2000 | Bohn |
| 6,131,709 | A | 10/2000 | Jolly et al. |
| 6,149,174 | A | 11/2000 | Bohn |
| 6,336,648 | B1 | 1/2002 | Bohn |
| 6,619,684 | B2 | 9/2003 | Miyoshi |
| 8,091,910 | B2 | 1/2012 | Hara et al. |
| 2005/0252330 | A1 | 11/2005 | Denk |
| 2009/0102628 | A1* | 4/2009 | Takebayashi ................. 340/432 |

(Continued)

FOREIGN PATENT DOCUMENTS

| CN | 101417689 A | 4/2009 |
| EP | 1384659 A2 | 11/2003 |

(Continued)

*Primary Examiner* — Aaron L Troost
(74) *Attorney, Agent, or Firm* — Global IP Counselors, LLP

(57) ABSTRACT

A bicycle suspension control apparatus includes a user operating device and a controller. The controller is operatively coupled to the user operating device to selectively control a pair of bicycle suspensions between a plurality of operating states. The controller selectively changes the operating states of both of the suspensions to different ones of the operating states in response to a single operation of the user operating device. The controller includes a receiving part, a storage part and a control part. The receiving part receives combination information indicating at least one combination of the operating states from among combinations of the operating states of the suspensions. The storage part stores the combination information received by the receiving part. The control part controls the suspensions based on the combination information stored in the storage part when the user operating device is operated.

11 Claims, 18 Drawing Sheets

(56) References Cited

U.S. PATENT DOCUMENTS

| | | | | |
|---|---|---|---|---|
| 2009/0192673 A1* | 7/2009 | Song | ............... | B62K 21/08 |
| | | | | 701/37 |
| 2010/0276906 A1* | 11/2010 | Galasso | ............ | B60G 15/12 |
| | | | | 280/283 |
| 2011/0109060 A1* | 5/2011 | Earle | ............... | B62K 25/28 |
| | | | | 280/283 |
| 2011/0202236 A1* | 8/2011 | Galasso | ............ | B62K 25/04 |
| | | | | 701/37 |

FOREIGN PATENT DOCUMENTS

| | | |
|---|---|---|
| EP | 2 103 512 A2 | 9/2009 |
| JP | 61-37514 A | 2/1986 |
| WO | WO-03/022671 A2 | 3/2003 |

* cited by examiner

STANDARD SETTING

FUNCTION

| | FS | RS | FS + RS | |
|---|---|---|---|---|
| OP1 | | | | |
| LSW1 | LOCK | FREE | FRONT LOCK + REAR FREE | FRONT FREE + REAR LOCK |
| LSW2 | FREE | LOCK | FRONT LOCK + REAR FREE | FRONT FREE + REAR LOCK |
| OP2 | FS | RS | FS + RS | |
| RSW1 | LOCK | FREE | FRONT LOCK + REAR FREE | FRONT FREE + REAR LOCK |
| RSW2 | FREE | LOCK | FRONT LOCK + REAR FREE | FRONT FREE + REAR LOCK |

[ SELECT ]

FIG. 11

LONG PUSH SETTINGS

FUNCTION

| | | FS | RS | FS + RS | | MODE |
|---|---|---|---|---|---|---|
| OP1 | | | | | | |
| LSW1 | SHORT PUSH | LOCK | FREE | FRONT LOCK + REAR FREE | FRONT FREE + REAR LOCK | MODE1 MODE 2 |
| LSW1 | LONG PUSH | FREE | LOCK | FRONT LOCK + REAR FREE | FRONT FREE + REAR LOCK | MODE1 MODE 2 |
| | | FS | RS | FS + RS | | MODE |
| LSW2 | SHORT PUSH | LOCK | FREE | FRONT LOCK + REAR FREE | FRONT FREE + REAR LOCK | MODE1 MODE 2 |
| LSW2 | LONG PUSH | FREE | LOCK | FRONT LOCK + REAR FREE | FRONT FREE + REAR LOCK | MODE1 MODE 2 |
| OP2 | | FS | RS | FS + RS | | MODE |
| RSW1 | SHORT PUSH | LOCK | FREE | FRONT LOCK + REAR FREE | FRONT FREE + REAR LOCK | MODE1 MODE 2 |
| RSW1 | LONG PUSH | FREE | LOCK | FRONT LOCK + REAR FREE | FRONT FREE + REAR LOCK | MODE1 MODE 2 |
| | | FS | RS | FS + RS | | MODE |
| RSW2 | SHORT PUSH | LOCK | FREE | FRONT LOCK + REAR FREE | FRONT FREE + REAR LOCK | MODE1 MODE 2 |
| RSW2 | LONG PUSH | FREE | LOCK | FRONT LOCK + REAR FREE | FRONT FREE + REAR LOCK | MODE1 MODE 2 |

[ SELECT ]

FIG. 12

BICYCLE SUSPENSION CONTROL APPARATUS

CROSS-REFERENCE TO RELATED APPLICATIONS

This application claims priority under 35 U.S.C. § 119 to Japanese Patent Application No. 2011-043068, filed Feb. 28, 2011. The entire disclosure of Japanese Patent Application No. 2011-043068 is hereby incorporated herein by reference.

BACKGROUND

Field of the Invention

This invention generally relates to a bicycle suspension control apparatus. More specifically, the present invention relates to a bicycle suspension control apparatus configured to control a front suspension and a rear suspension of a bicycle.

Background Information

Bicycle suspensions are known that are adjustable such that a stiffness of the suspension can be adjusted (e.g., see U.S. Patent Application Publication No. 2005/0252330). The suspension control apparatus disclosed in the above mentioned publication is configured to set a stiffness of a suspension to any one of a plurality of levels using an operating device provided on a handlebar of a bicycle. The user operating device is connected to a suspension with a wire. Alternatively, the user operating device is connected to a front suspension and a rear suspension with wires. Thus, the operating states of both the front and rear suspensions can be changed with a single operation of the user operating device. With the control apparatus of the above mentioned publication, the operating states of the front and rear suspensions are changed simultaneously.

SUMMARY

Since the technology presented in above mentioned publication is configured such that a combination of the operating states of the front and rear suspensions is predetermined by the operating device, a user cannot change the preset combination of operating states as desired.

One object of the present disclosure is to provide a bicycle suspension control apparatus that enables settings of a combination of operation states of front and rear suspensions to be changed and enables the combination to be easily changed to different combinations by the user.

In view of the state of the known technology, a bicycle suspension control apparatus according to a first aspect is provided that comprises a user operating device and a controller. The controller is operatively coupled to the user operating device to selectively control a front bicycle suspension between a plurality of operating states and a rear bicycle suspension between a plurality of operating states. The controller is configured to selectively change the operating states of both the front and rear bicycle suspensions to different ones of the operating states in response to a single operation of the user operating device. The controller includes a receiving part, a storage part and a control part. The receiving part receives combination information indicating at least one combination of the operating states from among combinations of the operating states of the front and rear bicycle suspensions. The storage part stores the combination information received by the receiving part. The control part controls the front and rear bicycle suspensions based on the combination information stored in the storage part when the user operating device is operated.

Consequently, by changing the combination information stored in the storage part, the settings for the combinations of the front and rear suspensions can be changed. For example, the setting information can be configured such that a plurality of sets of combinations are assigned to one operating device such that a plurality of combinations can be changed with one operating device. It is also possible to provide a plurality of operating devices and assign one set of combination information to each operating device such that different combinations can be selected with a plurality of operating devices. A set of combination information is a combination of an operating state of the front suspension and an operating state of the rear suspension. Consequently, the combinations of operating states of the front and rear suspensions can be changed easily by operating an operating device.

A bicycle suspension control apparatus according to a second aspect is provided according to the first aspect, wherein the combination information in the storage part includes at least one of the following: a first combination information, a second combination information, a third combination information, and a fourth combination information. The first combination information configured to set the front and rear bicycle suspensions into a locked state for preventing expansion and contraction. The second combination information configured to set the front and rear bicycle suspensions into a free state for expanding and contracting. The third combination information configured to set the front bicycle suspension into the free state and set the rear bicycle suspension into the locked state. The fourth combination information configured to set the front bicycle suspension into the locked state and set the rear bicycle suspension into the free state. With this aspect, the front suspension and the rear suspension can be controlled with at least one set of combination information among four sets of combination information stipulating whether each of the front suspension and the rear suspension can or cannot expand and contract.

A bicycle suspension control apparatus according to a third aspect is provided according to the first or second aspect, wherein the receiving part includes a connecting port that is configured to be connected to an external device that outputs the combination information. With this aspect, the combination of operating states can be changed with combination information outputted from, for example, a personal computer or other external device. Consequently, a control part provided on the bicycle can have a simpler structure.

A bicycle suspension control apparatus according to a fourth aspect is provided according to any one of the first to third aspects, wherein the user operating device includes at least one switch. With this aspect, the suspensions can be controlled with a switch operation because the operating device includes a switch.

A bicycle suspension control apparatus according to a fifth aspect is provided according to the fourth aspect, wherein the combination information in the storage part includes a plurality of combinations of the operating states assigned to a single one of the at least one switch. With this aspect, the operating state combination can be changed among a plurality of combinations with a single operating device and the number of operating devices can be reduced.

A bicycle suspension control apparatus according to a sixth aspect is provided according to any one of the first to fifth aspects, further comprising a notification unit that reports an operating state of at least one of the front and rear bicycle suspensions. With this aspect, a user can be prevented from making an operating mistake because the user can confirm an operating state of at least the front suspension or the rear suspension.

A bicycle suspension control apparatus according to a seventh aspect is provided according to any one of the first to sixth aspects, wherein the user operating device communicates with the control part through a wired connection. With this aspect, communication between the operating device and the control part can be accomplished easily because the operating device and the control part can communicate with a wired connection.

A bicycle suspension control apparatus according to an eighth aspect is provided according to any one of the first to sixth aspects, wherein the user operating device communicates with the control part through a wireless connection. With this aspect, it is not necessary to perform work to connect a wire between the operating device and the control part because the operating device and the control part communicate wirelessly.

In the bicycle suspension control apparatus, a front suspension and a rear suspension are controlled in a coordinated fashion based on combination information stored in a storage part. Consequently, by changing the combination information stored in the storage part, settings defining combinations of the front and rear suspensions can be changed. A set of combination information expresses a combination of an operating state of the front suspension and an operating state of the rear suspension. Consequently, the combination of operating states of the front and rear suspensions can be changed easily by operating an operating device.

BRIEF DESCRIPTION OF THE DRAWINGS

Referring now to the attached drawings which form a part of this original disclosure:

FIG. 11 is a schematic view of a setting screen for standard settings of the switches when a coordinated mode has been selected;

FIG. 12 is a schematic view of a setting screen for long push settings of the switches when an independent mode has been selected with respect to a first operating device;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
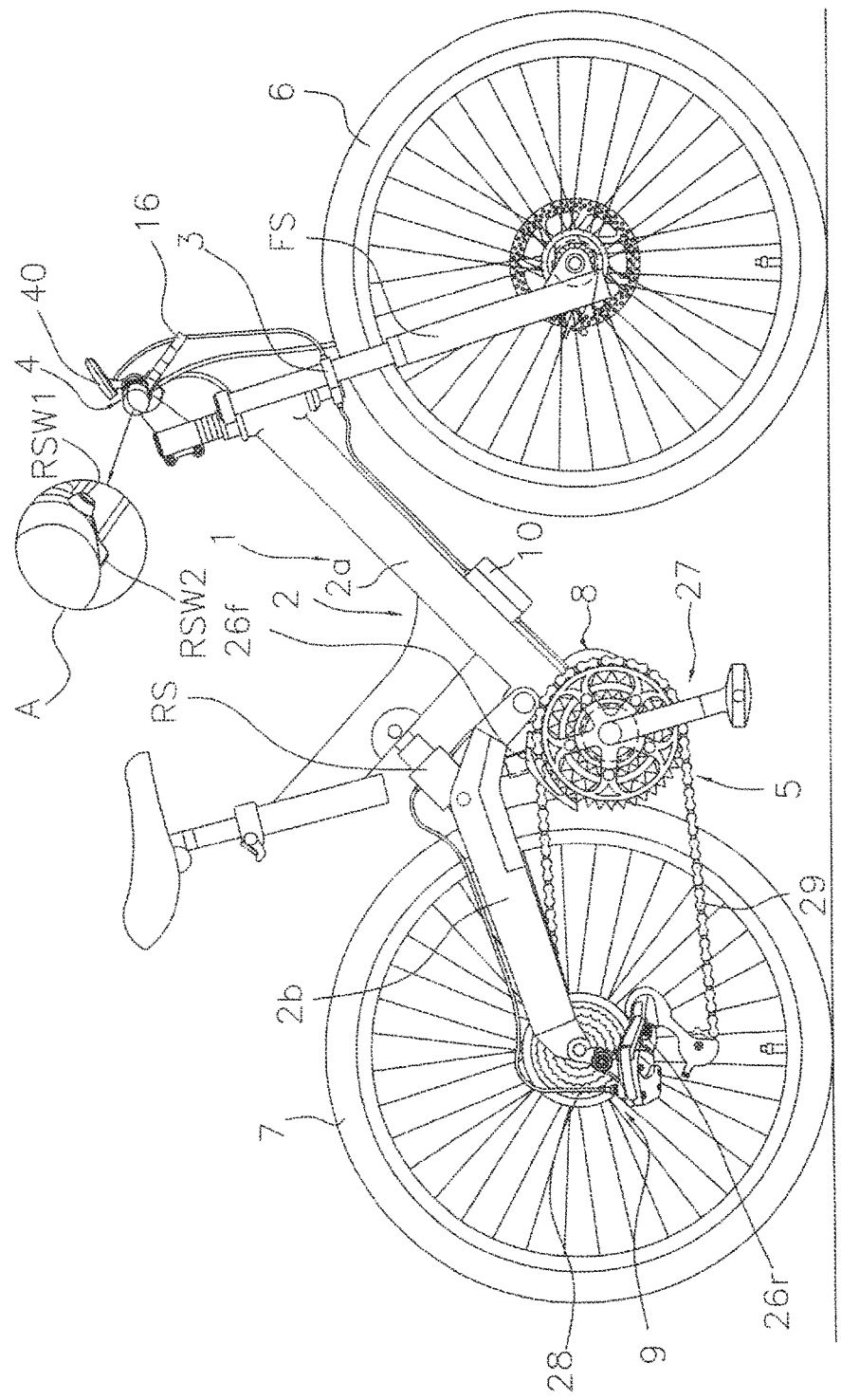
FIG. 1 is a side elevational view of a bicycle that is equipped with a bicycle suspension control apparatus in accordance with one embodiment.

Referring initially to FIG. 1, a bicycle is that is equipped with a bicycle suspension control apparatus in accordance with one embodiment. The bicycle is, for example, a mountain bike. The bicycle has a frame 1 on which are provided a front wheel 6, a rear wheel 7, and a drive unit 5 that includes a front electric powered transmission device 8 and a rear electric powered transmission device 9. The frame 1 comprises a frame body 2, a front fork 3, and a handlebar unit 4. The frame body 2 has a frame main body 2a and a swing arm 2b coupled to a rear section of the frame main body 2a such that it can pivot freely. A rear suspension RS is provided between the frame main body 2a and the swing arm 2b. The front fork 3 has a front suspension FS. Each of the front suspension FS and the rear suspension RS is configured such that it can assume one of two operating states: a free state and a locked state. In the free state, the suspension can expand and contract. The term "a locked state" in which a suspension cannot expand and contract, as used herein, encompasses a state in which a suspension is prohibited from expanding and contracting but still may expand and contract in a limited situation e.g. by a separate blow-off structure as well as a state in which a suspension is completely prohibited from expanding and contracting. The free state is also called a "lock-released state." The operating state of a suspension is also called a "setting state" of the suspension.

The front suspension FS and the rear suspension RS are configured such that the operating states thereof can be controlled using electricity. Each of the front suspension FS and the rear suspension RS includes a motor and a solenoid or other actuator. The operating state of the front suspension FS or the rear suspension RS can be changed by operating the actuator of the front suspension FS or the rear suspension RS and controlling a valve provided inside the front suspension FS or the rear suspension RS.

The front electric powered transmission device 8 has an electric powered derailleur 26f and a crank assembly 27. The rear electric powered transmission device 9 has an electric powered rear derailleur 26r and a cassette sprocket 28. A chain 29 is arranged across the crank assembly 27 and the cassette sprocket 28. The front wheel 6 is attached to a lower portion of the front fork 3. The rear wheel 7 is attached to a rearward portion of the swing arm 2b.

Figure 2:
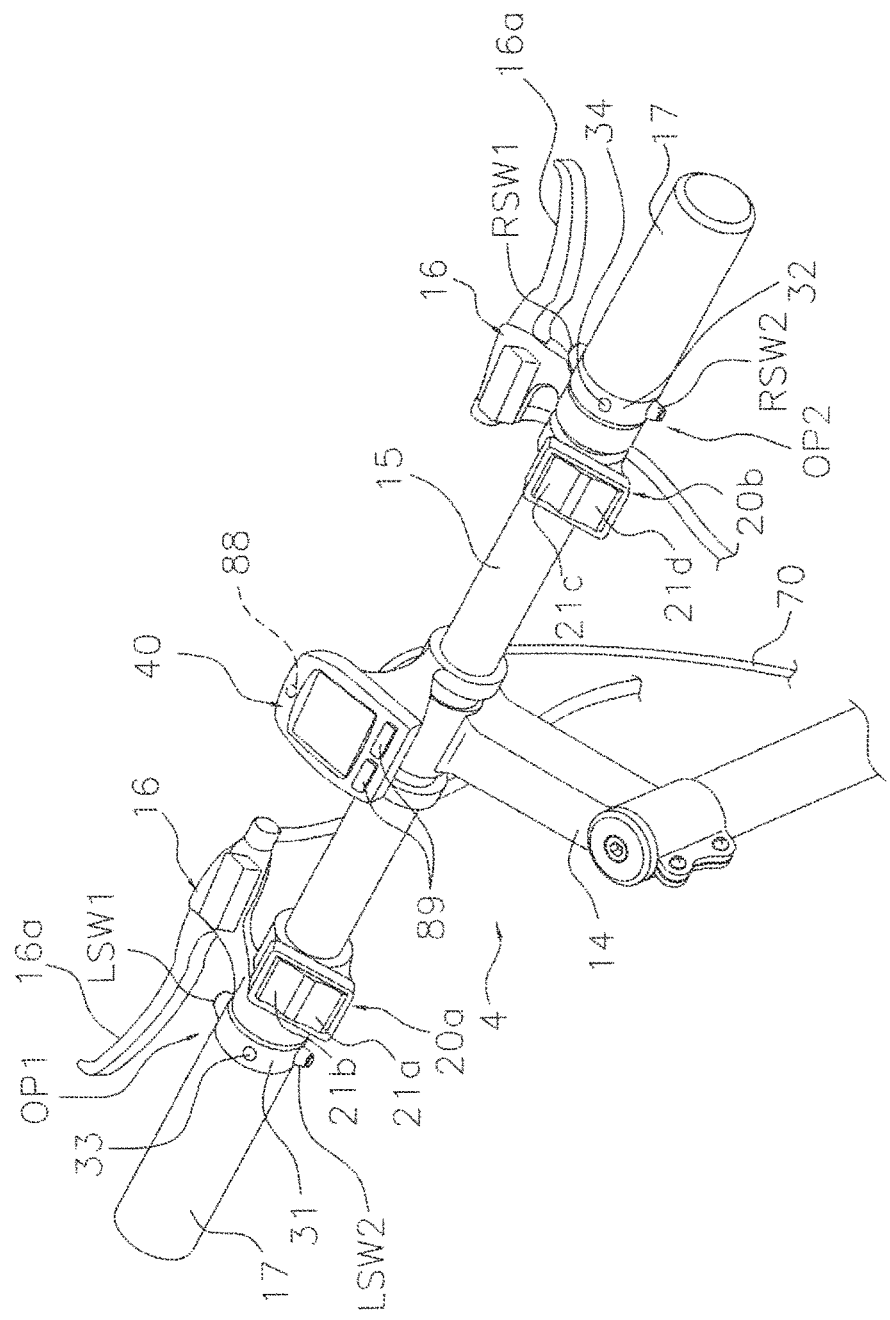
FIG. 2 is a perspective view of a handlebar unit of the bicycle shown in FIG. 1.

An electric power supply device 10 serves as an electric power source for the front electric powered transmission device 8, the rear electric powered transmission device 9, the front suspension FS and the rear suspension RS. The electric power supply device 10 is attached to the frame body 2. As shown in FIG. 2, the handlebar unit 4 has a handlebar stem 14 that is fixed to an upper portion of the front fork 3 and a handlebar 15 that is fixed to the handlebar stem 14. A brake lever 16 and a grip 17 are attached at each of both ends of the handlebar 15. A first user operating device OP1 or a second user operating device OP2 is provided between the brake lever 16 and the grip 17 at each end of the handlebar 15. The first user operating device OP1 and the second user operating device OP2 are provided for switching the operating states of the front suspension FS and the rear suspension RS.

The first user operating device OP1 has a first switch LSW1 and a second switch LSW2. The first switch LSW1 and the second switch LSW2 are switches that can be operated in a particular direction. In this embodiment, the switches are push button switches. It is also acceptable if the first switch LSW1 and the second switch LSW2 are sliding switches that operate by sliding an operating piece or lever switches that operate by changing the angle of a lever-like operating piece. The first switch LSW1 and the second switch LSW2 are arranged on a left-hand side of the handlebar 15 when one is facing in a forward movement direction of the bicycle. Hereinafter, the first switch LSW1 is called the first left switch LSW1 and the second switch LSW2 is called the second left switch LSW2.

The second user operating device OP2 has a third switch RSW1 and a fourth switch RSW2. The third switch RSW1 and the fourth switch RSW2 are switches that can be operated in a particular direction. In this embodiment the switches are push button switches. It is also acceptable if the third switch RSW1 and the fourth switch RSW2 are sliding switches that operate by sliding an operating piece or lever switches that operate by changing the angle of a lever-like operating piece. The third switch RSW1 and the fourth switch RSW2 are arranged on a right-hand side of the handlebar 15 when one is facing in a forward movement direction of the bicycle. Hereinafter, the third switch RSW1 is called the first right switch RSW1 and the fourth switch RSW2 is called the second right switch RSW2.

Near each of the brake levers 16 is provided a front gear shifting unit 20a for operating the front electric powered transmission device 8 and a rear gear shifting unit 20b for operating the rear electric powered transmission device 9. With this embodiment, the first user operating device OP1 and the front gear shifting unit 20a are arranged on opposite sides of a mounting portion of the left-hand brake lever 16, and the second user operating device OP2 and the rear gear shifting unit 20b are arranged on opposite sides of a mounting portion of the right-hand brake lever 16.

Figure 3:
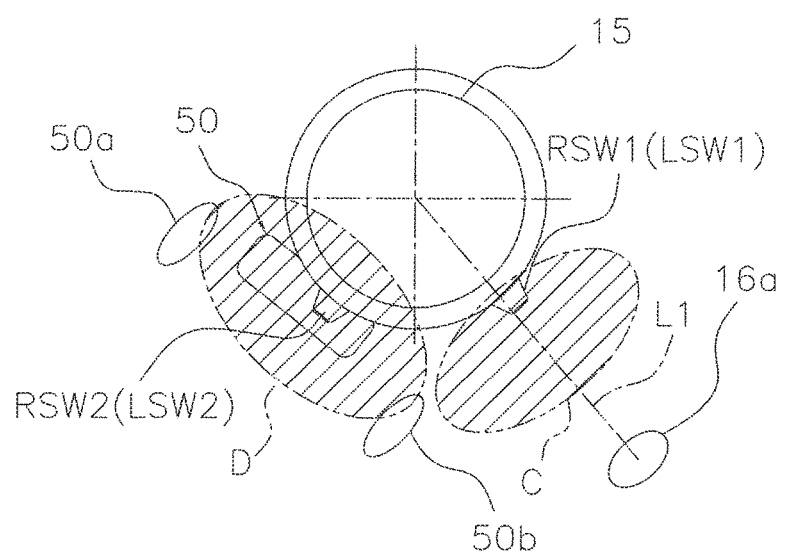
FIG. 3 is a schematic elevational side view of the handlebar unit shown in FIG. 2.

The first left switch LSW1 and the first right switch RSW1 are preferably arranged in a region C indicated with hatching in FIG. 3. The region C lies between a lever body 16a of the brake lever 16 and the handlebar 15. More specifically, the switches are preferably arranged near a line L1 joining a center of the brake lever 16 and a center of the handlebar 15. The region C is positioned frontward and downward of the handlebar 15. The region C serves as a region in which a space can be secured between the lever body 16a and the handlebar 15 even when the lever body 16a is pivoted toward the handlebar 15 during a brake operation. As a result, a different finger of the hands that operate each of the lever bodies 16a can be used to operate the first left switch LSW1 and the first right switch RSW1 in order to change an operating state of each of the suspensions. Additionally, since the first left switch LSW1 and the first right switch RSW1 are arranged in positions near a plane in which the brake levers pivot, an operating state of a suspension can be changed swiftly while fingers remain engaged with a brake lever.

Mistaken operations of the first left switch LSW1 and the first right switch RSW1 can be prevented by configuring the switches to operate in different directions than the operating directions of the brake levers 16. For example, the first left switch LSW1 and the first right switch RSW1 can be configured to operate perpendicularly to the operating directions of the brake levers 16.

As shown in FIG. 2, in this embodiment, the first left switch LSW1 and the second left switch LSW2 are mounted to a first switch bracket 31 that can be attached to the handlebar 15. A first notification unit 33 is provided on the first switch bracket 31. The first notification unit 33 comprises, for example, one or a plurality of LEDs (light emitting diodes).

The first right switch RSW1 and the second right switch RSW2 are mounted to a second switch bracket 32 that can be attached to the handlebar 15. A second notification unit 34 is provided on the second switch bracket 32. The second notification unit 34 comprises, for example, one or a plurality of LEDs (light emitting diodes).

The first notification unit 33 and the second notification unit 34 serve to indicate operating states of the front suspension FS and the rear suspension RS. For example, each of the first notification unit 33 and the second notification unit 34 might indicate an operating state of one or the other of the front suspension FS and the rear suspension RS. More specifically, for example, the first notification unit 33 might indicate an operating state of the front suspension FS and the second notification unit 34 might indicate an operating state of the rear suspension RS.

In this embodiment, the first left switch LSW1, the second left switch LSW2, the first right switch RSW1, and the second right switch RSW2 are each capable of operating in at least one of the following operating modes: a standard mode and a long push mode. In the standard mode, the operation of the switches is not related to an amount of time over which the user operating device OP1 or OP2 is operated. In the long push mode, the operation of the switches is related to an amount of time over which the user operating device OP1 or OP2 is operated. More specifically, the switches are operated using a combination of short-push operations in which the switch is pushed for an amount of time shorter than a prescribed amount of time and long push operations in which the switch is pushed for an amount of time equal to or longer than the prescribed amount of time.

The front gear shifting unit 20a has a front upshift switch 21a and a front downshift switch 21b. The rear gear shifting unit 20b has a rear upshift switch 21c and a rear downshift switch 21d.

A cycling computer 40 is detachably mounted on the handlebar 15. The cycling computer 40 is indicates typical cycling computer content, such as a traveling speed of the bicycle. The cycling computer 40 is also configured to indicate states of the transmission devices and operating states of the front suspension FS and the rear suspension RS, i.e., a combination of the operating states. The operating mode indicates if the long push mode is selected or not. The cycling computer 40 is provided with a speaker 88 that will be explained later and a plurality of operating buttons 89.

Figure 4:
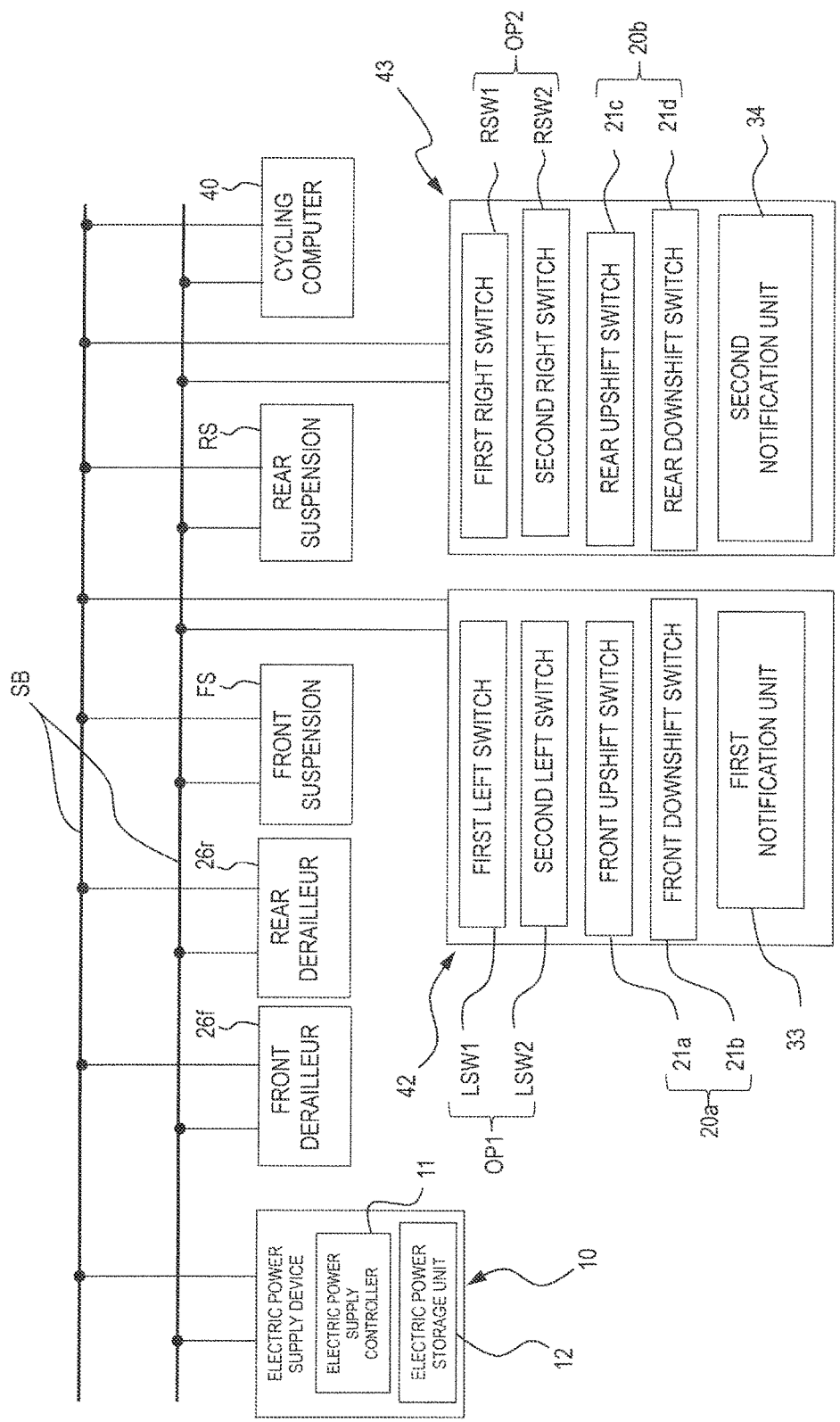
FIG. 4 is a block diagram showing an electric component connection structure.

As shown in FIG. 4, the electric power supply device 10 has an electric power supply controller 11 and an electric power storage unit 12 serving as an electric power source. The electric power supply controller 11 is an example of a control device configured to control a suspension. The electric power storage unit 12 can be attached and detached to and from the electric power supply controller 11. The electric power supply controller 11 controls the electric power storage unit 12. The power supply control device 11 also serves as a general controller of the front electric powered transmission device 8, the rear electric power transmission device 9, the front suspension FS, the rear suspension RS, the first switch unit 42, and the second switch unit 43.

The electric power supply controller 11, the front derailleur 26f, the rear derailleur 26r, the front suspension FS, the rear suspension RS, the cycling computer 40, the first switch unit 42, the second switch unit 43 each constitute an electric component. These electric components are connected with a serial bus structure SB. The first switch unit 42 includes the first left switch LSW1, the second left switch LSW2, the front upshift switch 21a, the front downshift switch 21b, and the first notification unit 33. The second switch unit 43 includes the first right switch RSW1, the second right switch RSW2, the rear upshift switch 21c, the rear downshift switch 21d, and the second notification unit 34.

The electric power supply device 10 and the other electric components are connected such that they can communicate through electric power lines. Consequently, an electrical system comprising the electric components can operate regardless of whether any particular electric component, excluding the electric power supply device 10, is connected or disconnected.

Figure 5:
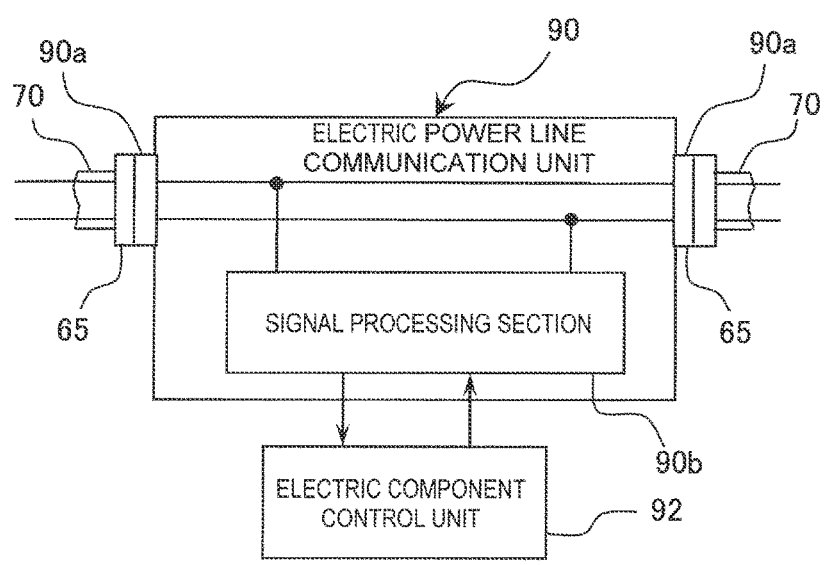
FIG. 5 is a block diagram of a power line communication section.

Each of the electric components has an electric power line communication unit 90 and an electric component control unit 92, as shown in FIG. 5. The electric power line communication unit 90 is configured to communicate by using a PLC (power line communications). That is, two-way communication is executed through electric power lines 70. Each of the electric power line communication units 90 has one or a plurality of electric power line connecting sections 90a. Plugs 65 are provided on both ends of the electric power line 70, and each of the electric power line connecting sections 90a is configured to latch onto a plug 65 such that it is secured in a detachable fashion.

Each of the electric power line communication units 90 also has a signal processing section 90b configured to decode and modulate control signals superimposed on electric power. The signal processing section 90b is configured to decode and modulate control signals using, for example, an OFDM method (orthogonal frequency division multiplexing method). The electric component control unit 92 of each of the front electric powered transmission device 8, the rear electric powered transmission device 9, the front suspension FS, and the rear suspension RS serves to control the electric power line communication unit 90 of the same electric component so as to communicate with other electric components and to control an actuator provided on the same electric component based on commands received from the electric power supply controller 11. The electric component control units 92 are provided on the first switch unit 42 and the second switch unit 43. The electric component control units 92 are configured to detect switch operations. The electric component control units 92 are further configured to control the first notification unit 33 or the second notification section 34. The electric component control units 92 are also configured to control the electric power line communication unit 90 so as to communicate with other electric components.

Figure 6:
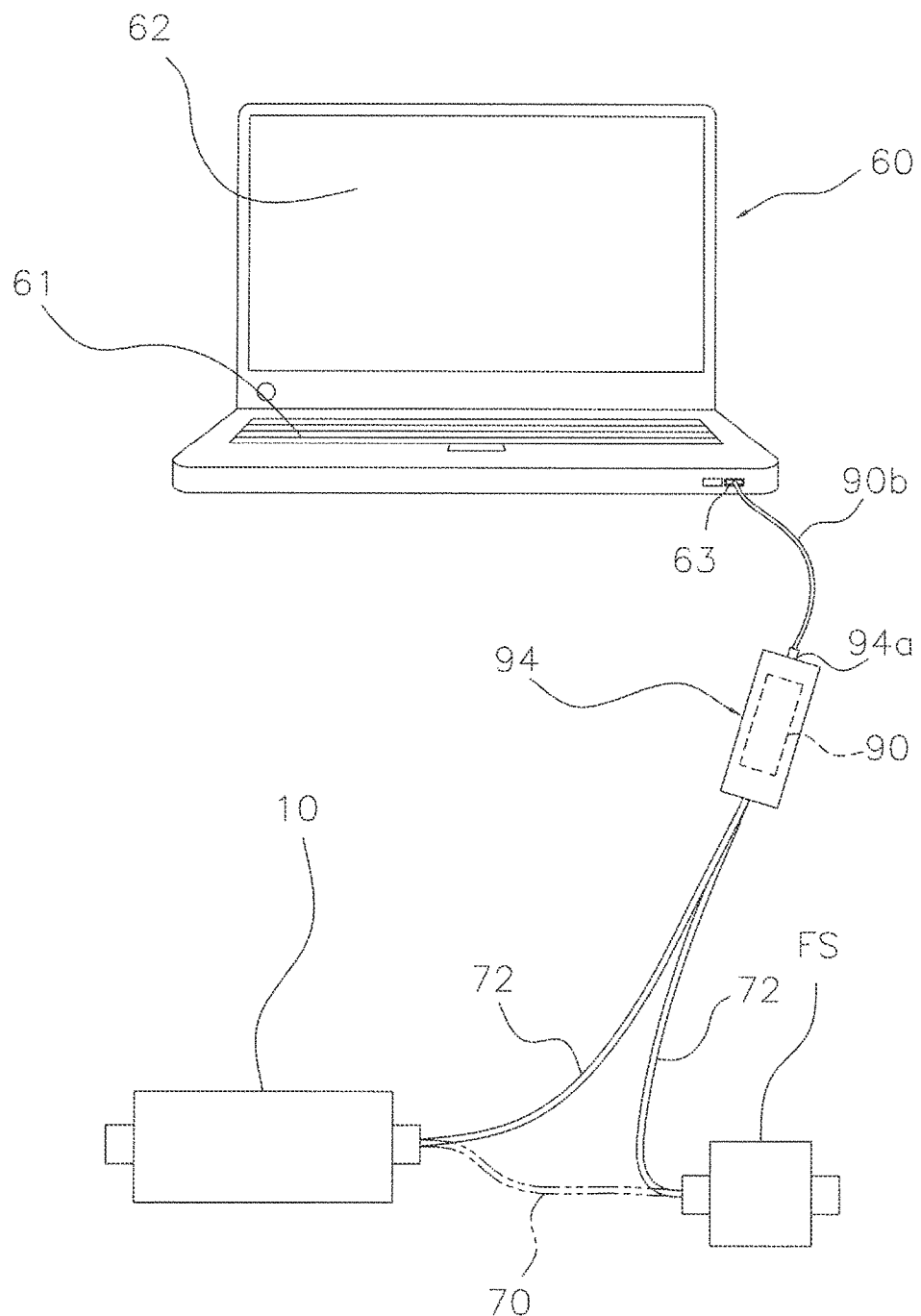
FIG. 6 is a block diagram showing how an external device is connected.

As shown in FIG. 6, each of these electric components can be connected to an external device 60 through an adapter 94. The external device 60 is one possible example of a setting device. The adapter 94 includes the electric power line communication unit 90 and a connecting port (e.g., USP (universal serial bus) port) 94a for connecting to the external device 60. The connecting port 94a is provided on an outward side face of the adapter 94. In this embodiment, the adapter 94 has two electric power lines 72. In FIG. 6, the adapter 94 can be electrically connected to an electric component by disconnecting an electric power line 70 that connects the electric component to another electric component. For example, in FIG. 6, after an electric power line 70 is removed from between the front suspension FS and the electric power supply device 10, the two electric power lines 72 extending from the adapter 94 are connected to the electric power line connecting sections 90a of the front suspension FS and the power supply 10.

The external device 60 is, for example, a notebook-type computer. The external device 60 is used at least for setting an operating mode of the first left switch LSW1, the second left switch LSW2, the first right switch RSW1, and the second right switch RSW2.

As shown in FIG. 6, the external device 60 has a selecting unit 61, a display unit 62, and a communication unit 63 equipped with a connecting port 63a. The selecting unit 61 includes a keyboard and a mouse, touch pad, and/or other pointing device. The selecting unit 61 serves to select setting information to be displayed on the display unit 62. The display unit 62 displays setting information that can be set with respect to the first user operating device OP1 and the second user operating device OP2. The connecting port 63a can be, for example, a USB port. In this case, the connecting port 63a can be considered a wired connection section or part. Alternatively, the connecting port 63a can be, for example, a wireless communication device or part. The connecting port 63a can be electrically connected to the electric power supply controller 11 installed on the bicycle through a connecting cable 99 comprising, for example, a USB cable and the adapter 94. In this way, setting information selected using the selecting unit 61 can be transmitted to, for example, the electric power supply controller 11.

Figure 7:
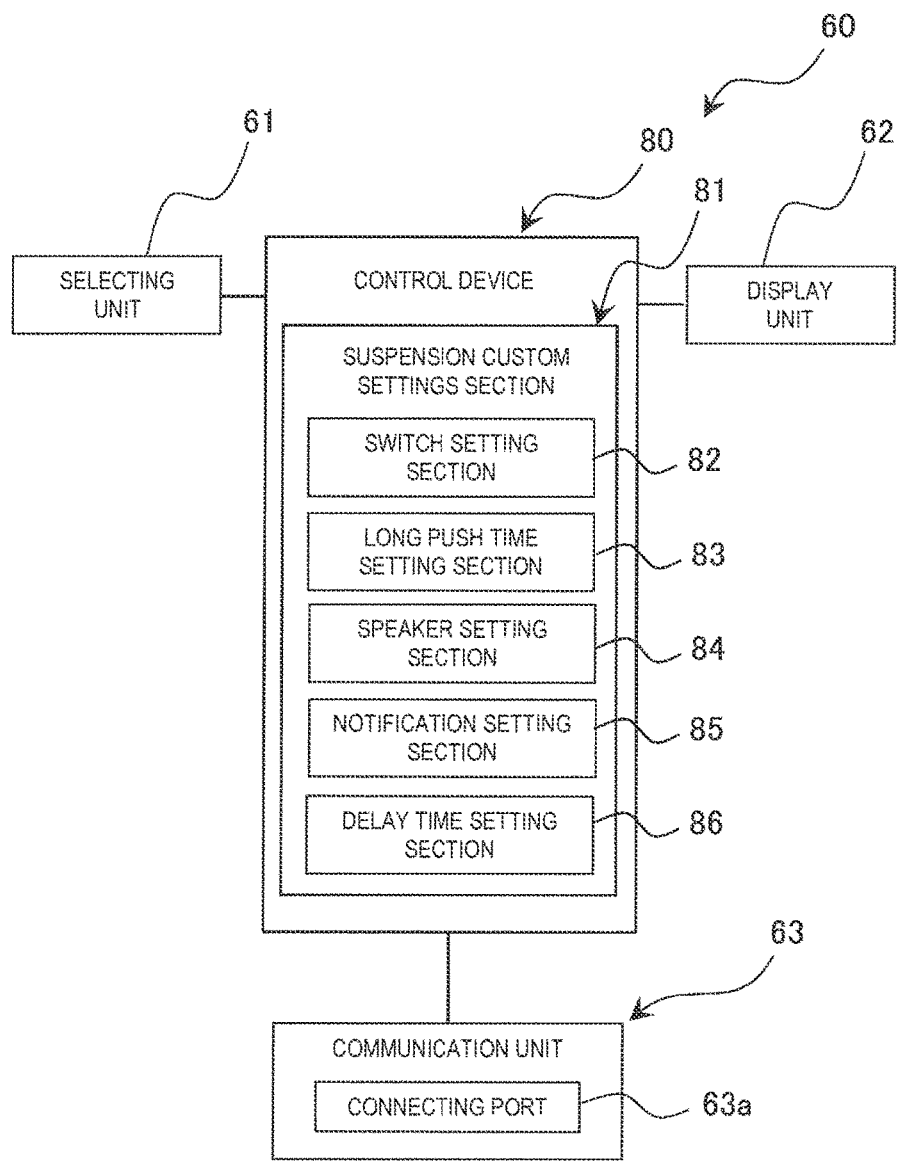
FIG. 7 is a block diagram showing functional features of a control device of the external device.

As shown in FIG. 7, the external device 60 is equipped with a control device 80 that includes a microcomputer having a computer-readable medium (e.g., a hard drive, read only memory device, a flash drive, a removable disk, etc.) with a program such that upon execution of the program, the external device 60 (e.g., a computer) serves as a bicycle suspension control setting device. The control device 80 has a suspension custom setting section 81 that is a functional component realized with software. The custom setting section 81 has a switch setting section 82, a long push time setting section 83, a speaker setting section 84, a notification setting section 85, and a delay time setting section 86. The custom setting section 81 serves to allow the front suspension FS and the rear suspension RS to be set in accordance with a user's preference. The switch setting section 82 and the long push time setting section 83 are examples of an operation setting section that sets an operating method of a bicycle suspension operating device as part of the setting information that is selectively indicated on the display unit 62.

The switch setting section 82 serves to assign operating states or combinations of operating states of the front suspension FS and the rear suspension RS to the first user operating device OP1 and the second user operating device OP2.

The operating states of the front suspension FS and the rear suspension RS can be set (changed) using either an independent mode or a coordinated mode. In the independent mode, the operating states of the front suspension FS and the rear suspension RS are set individually using the first user operating device OP1 and/or the second user operating device OP2. In the coordinated mode, combinations of operating states of the front suspension FS and the rear suspension RS are set using the first user operating device OP1 and/or the second user operating device OP2.

In the independent mode, the operating states of the front suspension FS include a first state in which the front suspension FS cannot expand and contract and a second state in which the front suspension FS can expand and contract. Similarly, the operating states of the rear suspension RS include a third state in which the rear suspension RS cannot expand and contract and a fourth state in which the front suspension RS can expand and contract. The first state and the third state are locked states. The second state and the fourth state are free states. In the independent mode, the first user operating device OP1 and/or the second user operating device OP2 can be used to select between two operating states of the front suspension FS and to select between two operating states of the rear suspension RS independently of the operating state of the front suspension FS.

The coordinated mode includes the following four combinations (I to IV) of operating states.

I. The front suspension FS is set to the first state (locked) and the rear suspension RS is set to the third state (locked). Hereinafter, this combination is called "fully rigid."

II. The front suspension FS is set to the second state (free) and the rear suspension RS is set to the fourth state (free). Hereinafter, this state is called "full suspension".

III. The front suspension FS is set to the second state (free) and the rear suspension RS is set to the third state (locked). Hereinafter, this combination is called "hard tail."

IV. The front suspension FS is set to the first state (locked) and the rear suspension RS is set to the fourth state (free). Hereinafter, this combination is called "hard front." With the fully rigid combination, the front suspension FS and the rear suspension RS are both locked. The fully rigid combination is an example of a first combination information. With the full suspension combination, the front suspension FS and the rear suspension RS are both in a free state. The full suspension combination is an example of a second combination information. With the hard tail combination, the front suspension FS is in a free state and the rear suspension RS is in a locked state. The hard tail combination is an example of a third combination information. With the hard front combination, the front suspension FS is in a locked state and the rear suspension RS is in a free state. The hard front combination is an example of a fourth combination information. In the coordinated mode, the first user operating device OP1 and/or the second user operating device OP2 are/is used to select one of the four combinations of operating states.

The first user operating device OP1 and the second user operating device OP2 can be operated in either of the aforementioned standard mode and long push mode. In this embodiment, the combination of operating states that is currently set is indicated on the cycling computer 40. The operating states of the front suspension FS and the rear suspension RS are indicated on the first notification unit 33 and the second notification unit 34 regardless of whether the independent mode or the coordinated mode is selected. For example, it is acceptable for the first notification unit 33 to illuminate in red when the front suspension FS is in a locked state. Meanwhile, it is acceptable for the first notification unit 33 to go out (not illuminate) or illuminate in a different color when the front suspension FS is in a free state. Similarly, it is acceptable for the second notification unit 34 to illuminate in red when the rear suspension RS is in a locked state, and it is acceptable for the second notification unit 34 to go out (not illuminate) or illuminate in a different color when the rear suspension RS is in a free state. The operating state can also be indicated by the illuminated state of an LED, the number of LEDs that are illuminated, or the position of an illuminated LED. Illuminated states of an LED that can be employed to indicate an operating state include the color, a flashing state, a length of a flashing interval, and a number of times flashing occurs.

The long push time setting section 83 is provided to set a prescribed amount of time to be used to determine if a long push has occurred during long push mode. In this embodiment, the prescribed amount of time is set to one of a plurality of predetermined amounts of time.

Figure 18:
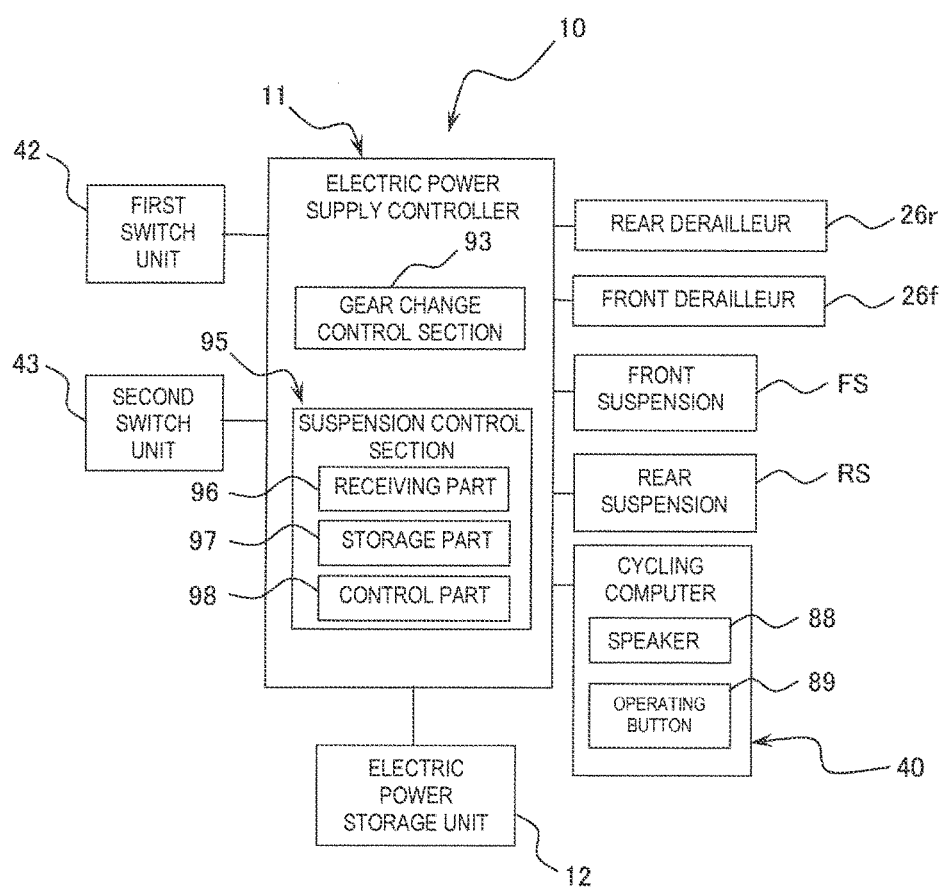
FIG. 18 is a block diagram showing the functional features of an electric power supply controller.

The speaker setting section 84 is provided for adjusting settings of a speaker 88 that is provided on the computer 40 shown in FIG. 18 to notify a user of a combination of operating states of the front suspension FS and the rear suspension RS during coordinated mode. The speaker 88 is not necessarily provided on the cycling computer 40 and it is acceptable for the speaker to be provided on another electric component or in a standalone fashion. The speaker setting section 84 enables a tone and a volume of the speaker 88 to be set. It is acceptable for the speaker 88 to be any sound generating device that can output a sound. For example, a buzzer can serve as the speaker 88.

The notification setting section 85 is provided for setting a notification state of the first notification unit 33 and the second notification unit 34. In this embodiment, the notification setting section 85 is provided for setting LEDs to an operating state that enables the LEDs or a non-operating state that disenables the LEDs. When the LED setting is turned on, i.e., when the LEDs are set to operate, the LEDs indicate the operating states of the suspensions as explained previously.

The delay time setting section 86 is provided for setting a delay time (a prescribed time interval) that will occur before the operating state of one or the other of the front suspension FS and the rear suspension RS starts to change after a user performs an operation to change an operating state combination of the front suspension FS and the rear suspension RS from the fully locked combination to the full suspension combination or from the full suspension combination to the fully locked combination during the coordinated mode.

The processing steps executed by the control device 80 of the external device 60 in order to accomplish custom settings of the suspensions will now be explained based on the flowchart shown in FIG. 8. In order to execute custom settings, a user must connect the adapter 94 between the external device 60 and any one of the electric components of the bicycle.

Figure 8:
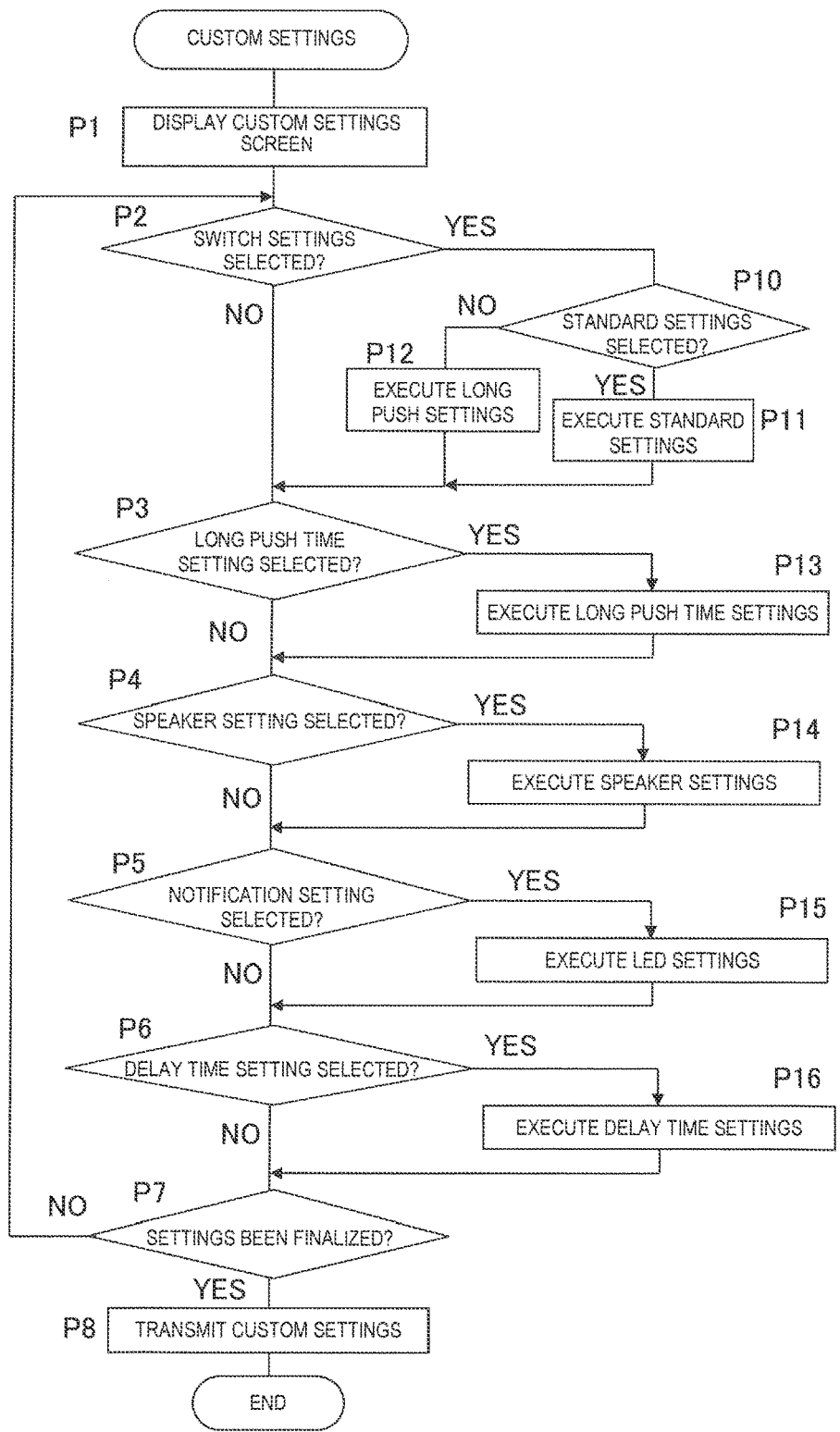
FIG. 8 is a flowchart showing operations executed by the control device to accomplish custom settings.
Figure 9:
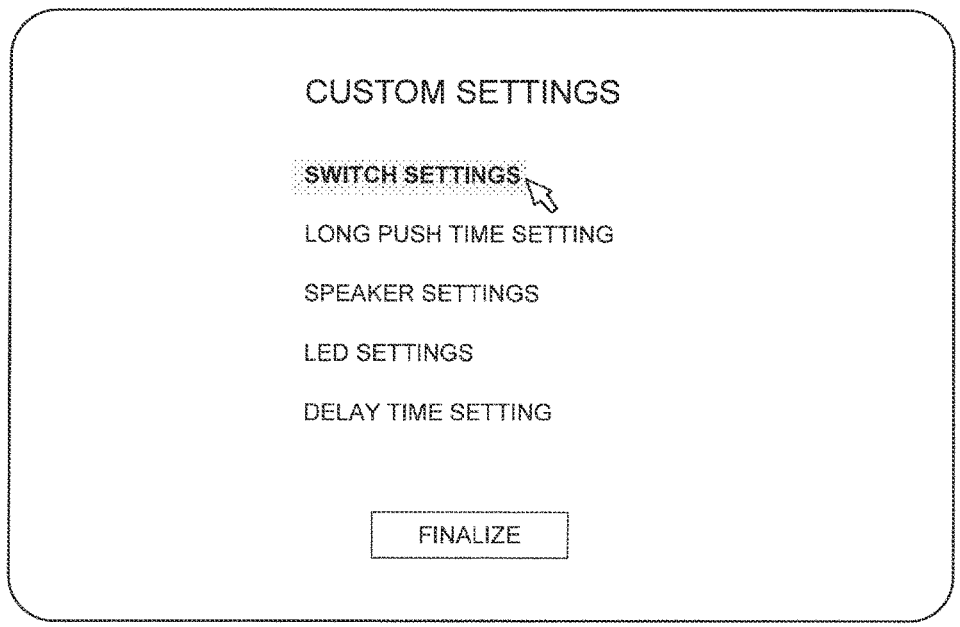
FIG. 9 is a schematic view of a custom settings screen for switches.

In a step P1 of FIG. 8, the custom settings screen is displayed as shown in FIG. 9. The custom settings screen shows the categories of custom settings that can be made with respect to the suspensions. In this embodiment, there are five setting categories: "Switch Settings," "Long push Time Setting," "Speaker Settings," "Notification Setting," and "Delay Time Setting." A user uses the selecting unit 61 to select one of the categories. For example, if the user uses a mouse to select the category, then the user aligns a pointer with the desired category and clicks the mouse. Or, if the user uses a keyboard to select the category, then the user moves a cursor using the keyboard and operates a select key to select the category. If the user uses a touch panel to select the category, then the user touches a portion of the touch panel where the category is displayed to select the category. In this embodiment, the explanation assumes a mouse is used to select the category. When a category is selected, the selected state is indicated by, for example, a change of a background color or a change of the color of the letters. As a result, the user can recognize which category has been selected.

In step P2, the control device 80 determines if Switch Settings has been selected. In step P3, the control device 80 determines if Long push Time Setting has been selected. In step P4, the control device 80 determines if Speaker Settings has been selected. In step P5, the control device 80 determines if Notification Setting has been selected. In step P6, the control device 80 determines if Delay Time Setting has been selected. In step P7, the control device 80 determines if a setting has been finalized. When the user has finished adjusting settings, the user selects a finalize button provided, for example, on a bottom portion of the custom settings screen. When the control device 80 determines that the settings have been finalized, the control device 80 proceeds from step P7 to step P8. In step P8, the control device 80 transmits information indicating the settings made through the custom settings to the electric power supply controller 11 through the adapter 94 and ends the control sequence.

If it determines that Switch Settings is selected in step P2, then the control device 80 proceeds from step P2 to step P10. In step P10, the control device 80 determines if Standard Settings has been selected. If Standard Settings has been selected, then the control device 80 proceeds to step P11. In step P11, the control device 80 executes standard settings and, when finished, proceeds to step P3.

Figure 10:
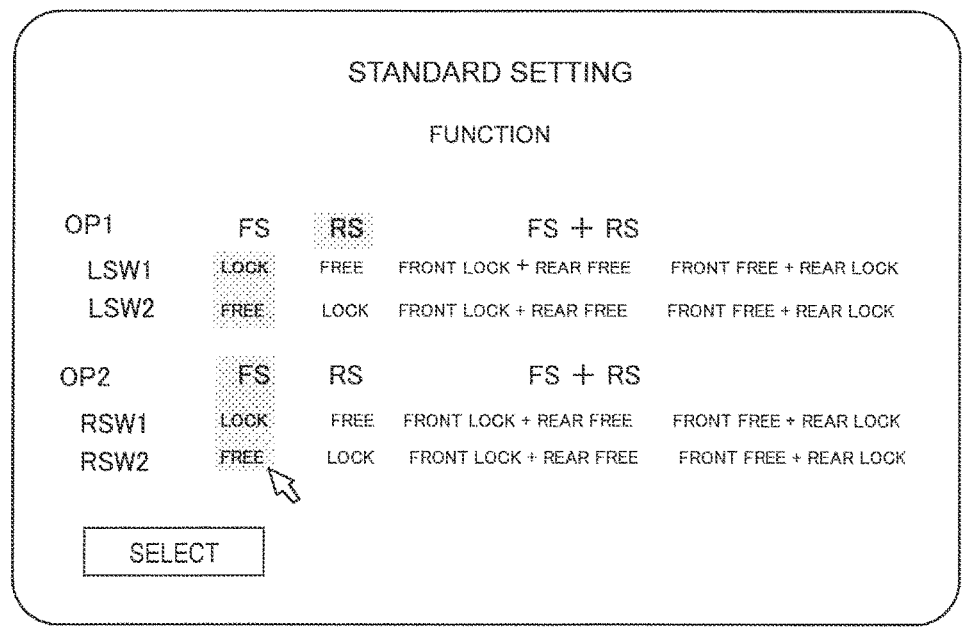
FIG. 10 is a schematic view of a setting screen for standard settings of the switches when an independent mode has been selected.

A standard settings screen displayed on the display unit 62 is shown in FIGS. 10 and 11. The display unit 62 constitutes one example of an indicating unit that displays setting information that corresponds to an operating state set by the first and second user operating devices OP1 and OP2. FIG. 10 shows a standard settings screen displayed when the independent mode is selected. More specifically, FIG. 10 illustrates a case in which the functions of the first left switch LSW1 and the second left switch LSW2 of the first user operating device OP1 and the functions of the first right switch RSW1 and the second right switch RSW2 of the second user operating device OP2 are assigned such that the operating states of the front suspension FS and the rear suspension RS are set individually.

In order to set the independent mode, the user first aligns, for example, the pointer with "FS" or "RS" and clicks the mouse. In this way, the user can select independent mode for the front suspension FS or the rear suspension RS. If "FS" is selected then the front suspension can be operated independently, and if "RS" is selected then the rear suspension can be operated independently. Next, the user assigns operating states to the switches. In FIG. 10, for example, a locked state of the rear suspension RS is assigned to the first left switch LSW1. Additionally, in FIG. 10, a free state of the rear suspension RS is assigned to the second left switch LSW2, a locked state of the front suspension FS is assigned to the first right switch RSW1, and a free state of the front suspension FS is assigned to the second right switch RSW2. When the task of assigning operating states to the switches is finished, the user aligns the pointer and clicks a Select button. The settings are stored in the external device 60 and the display returns to the custom settings screen.

Operating states are assigned to the switches by selecting at least one of the displayed operating states. If more than one operating state is assigned to a single switch, then the assigned operating states can be selected sequentially one-by-one each time the switch is operated. It is also acceptable not to assign a particular operating state to a switch if it is not necessary. For example, it is acceptable not to assign the locked state of the front suspension FS to a switch. Here, too, if the Select button is selected, then the settings are completed and the display returns to the custom settings screen.

FIG. 11 shows the standard settings screen when the coordinated mode is selected. More specifically, FIG. 11 illustrates a case in which the functions of the first left switch LSW1 and the second left switch LSW2 of the first user operating device OP1 and the functions of the first right switch RSW1 and the second right switch RSW2 of the second user operating device OP2 are assigned such that the operating states of the front suspension FS and the rear suspension RS are set as combinations of operating states.

In order to set the coordinated mode, the user first aligns, for example, the pointer with "FS+RS" and clicks the mouse. In this way, a coordinated mode in which the front suspension FS and the rear suspension RS operate in a coordinated manner can be selected. Next, the user assigns combinations of operating states to the switches. In FIG. 11, for example, a combination of a free state of the rear suspension RS and a locked state of the front suspension FS is assigned to the first left switch LSW1. This is the hard front combination of operating states. Additionally, in FIG. 11, a combination of a locked state of the rear suspension RS and a locked state of the front suspension FS is assigned to the second left switch LSW2, by selecting the locked state of the rear suspension RS. This is the fully locked combination of operating states. Also, in FIG. 11, a combination of a free state of the front suspension FS and a locked state of the rear suspension RS is assigned to the first right switch RSW1. This is the hard tail combination of operating states. Also, in FIG. 11, a combination of a free state of the front suspension FS and a free state of the rear suspension RS is assigned to the second right switch RSW2 by selecting the free state of the front suspension FS. This is the full suspension combination of operating states.

Operating states are assigned to the switches by selecting at least one of the displayed operating states. If more than one combination of operating states is assigned to a single switch, then the assigned combinations of operating states will be selected sequentially one-by-one each time the switch is operated. It is also acceptable not to assign a particular combination of operating states to a switch if it is not necessary. For example, it is acceptable if only the hard front combination is not assigned to a switch. In such a case, a user can change among three combinations of operating states using the user operating devices OP1 and OP2. It is also acceptable if the hard tail combination and the hard front combination are not assigned to a switch. In such a case, a user can change between two combinations of operating states using the user operating devices OP1 and OP2.

In this embodiment, as shown in FIGS. 10 to 13, the operations that can be assigned to the switches are displayed as a list on a display screen. However, it is also acceptable to configure the setting screen such that, for example, the operating states are selected from a pull down menu and only the selected operating states are displayed.

If the control device 80 determines in step P10 of FIG. 8 that standard setting is not selected and long push setting is selected, then the control device 80 proceeds to step P12. In step P12, the control device 80 executes long push settings and, when finished, proceeds to step P3.

Figures 13, 14:
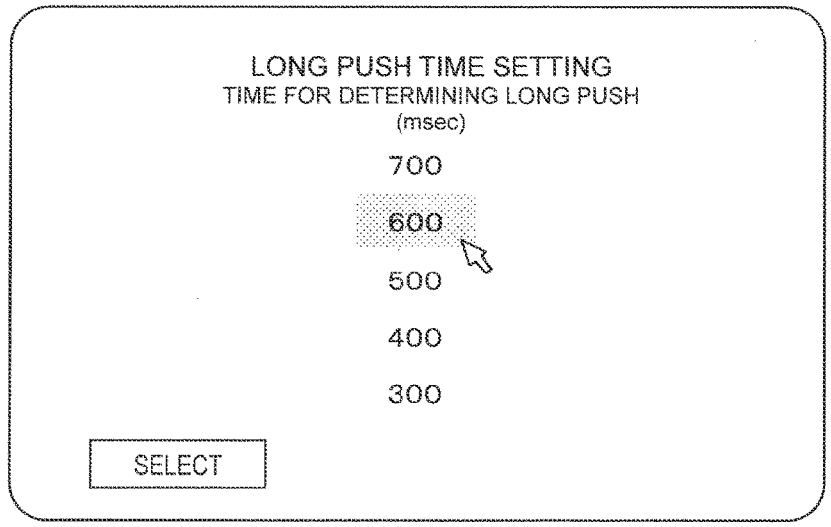
FIG. 13 is a schematic view of a setting screen for long push settings of the switches when a coordinated mode has been selected.
FIG. 14 is a schematic view of a switch long push time setting screen.

A long push setting screen displayed on the display unit 62 is shown in FIGS. 12 and 13. FIG. 12 shows a long push setting screen displayed when the independent mode is selected with respect to the first user operating device. More specifically, FIG. 12 illustrates a case in which the functions of the first left switch LSW1 and the second left switch LSW2 of the first user operating device OP1 are assigned such that the operating states of the front suspension FS and the rear suspension RS are set individually by long pushes and short pushes of the switches LSW1 and LSW2. It is also acceptable to assign operating states to the long push and short push operations of the first right switch RSW1 and the second right switch RSW2 of the second user operating device OP2 such that the operating states of the front suspension FS and the rear suspension RS can be set individually, but in this embodiment no assignments are set with respect to the second user operating device OP2. Therefore, in the independent mode, only the first user operating device OP1 is used to change the operating states of the suspensions. Of course, it is also acceptable to assign operating states to the second user operating device OP2 as well.

In order to set the independent mode, the user first aligns, for example, the cursor with "FS" or "RS" and clicks the mouse. In this way, the user can select independent mode for the front suspension FS or the rear suspension RS. Next, the user assigns operating states to the switches. In FIG. 12, for example, in the case of the first left switch LSW1, a free state of the rear suspension RS is assigned to a short push of the first left switch LSW1. Additionally, for example, a locked state of the rear suspension RS is assigned to a long push of the first left switch LSW1. Also in FIG. 12, for example, in the case of the second right switch RSW2, a locked state of the front suspension FS is assigned to a short push of the second right switch RSW2, and a free state of the front suspension FS is assigned to a long push of the second right switch RSW2.

Operating states are assigned to the switches by selecting at least one of the displayed operating states. If more than one operating state is assigned to a single switch, then the assigned operating states will be selected sequentially one-by-one each time the switch is operated. Also, similarly to the standard mode, it is acceptable not to assign a particular operating state to a switch if it is not necessary. For example, it is acceptable not to assign the locked state of the front suspension FS to a switch.

FIG. 13 shows the long push settings screen when the coordinated mode is selected. More specifically, FIG. 13 illustrates a case in which the long push and short-push operations of the first left switch LSW1 and the second left switch LSW2 of the first user operating device OP1 and the long push and short-push operations of the first right switch RSW1 and the second right switch RSW2 of the second user operating device OP2 are assigned such that the operating states of the front suspension FS and the rear suspension RS are set as combinations of operating states. When a plurality of combinations of operating states is assigned to a short push or a long push of a single switch, a Mode 1 and a Mode 2 can be selected to determine an order in which the combinations of operating states will change. In the Mode 1, the combinations change in the order fully rigid, hard tail, hard front, and full suspension. In Mode 2, the combinations change in the reverse order as in Mode 1, i.e., in the order full suspension, hard front, hard tail, and fully rigid.

In order to set the coordinated mode, similarly to standard settings, the user first aligns, for example, the pointer with "FS+RS" and clicks the mouse, thereby selecting a coordinated mode in which the front suspension FS and the rear suspension RS are operated in a coordinated manner. Next, the user assigns combinations of operating states to the switches.

FIG. 13 illustrates a case in which, for example, the fully rigid combination, the full suspension combination, and the hard front combination are assigned to the short push and long push operations of the first left switch LSW1 of the first user operating device OP1. In this example, the short push is set to Mode 1 and the long push is set to Mode 2. Thus, each time the switch is operated with a short push, the combination of operating states changes in the order fully rigid, hard front, and full suspension. When the full suspension operating state exists, the operating state will not change in response to a short push. Meanwhile, each time the switch is operated with a long push, the combination of operating states changes in the order full suspension, hard front, and fully rigid. When the fully rigid operating state exists, the operating state will not change in response to a long push.

FIG. 13 also illustrates a case in which, for example, all four combinations of operating states are assigned to the short push and long push operations of the second left switch LSW2 of the first user operating device OP1. That is, the four operating state combinations of fully rigid, hard tail, hard front, and full suspension are assigned to one switch. In this example, the short push is set to Mode 1 and the long push is set to Mode 2. Thus, each time the switch is operated with a short push, the combination of operating states changes in the order fully rigid, hard tail, hard front, and full suspension. Meanwhile, each time the switch is operated with a long push, the combination of operating states changes in the order full suspension, hard front, hard tail, and fully rigid.

FIG. 13 also illustrates a case in which, for example, the fully rigid combination, the full suspension combination, and the hard tail combination (three combinations) are assigned to the short push and long push operations of the first right switch RSW1 of the second user operating device OP2. In this example, the short push is set to Mode 2 and the long push is set to Mode 1. Thus, each time the switch is operated with a short push, the combination of operating states changes in the order full suspension, hard tail, and fully rigid. Meanwhile, each time the switch is operated with a long push, the combination of operating states changes in the order fully rigid, hard tail, and full suspension.

FIG. 13 also illustrates a case in which, for example, the fully rigid and full suspension combinations are assigned to the short push and long push operations of the second right switch RSW2 of the second user operating device OP2. In this case, the fully rigid combination is set when the second right switch RSW2 is operated with a short push and the full suspension combination is set when the second right switch RSW2 is operated with a long push.

In the cases presented above, operating states are assigned to the switches by selecting at least one of the displayed operating states. If more than one combination of operating states is assigned to a single switch, then the assigned combinations of operating states will be selected sequentially one-by-one each time the switch is operated. It is also acceptable not to assign a particular combination of operating states to a switch if it is not necessary. For example, it is acceptable if only the hard front combination is not assigned to a switch. In such a case, a user can change among three combinations of operating states using the user operating devices OP1 and OP2. It is also acceptable if the hard tail combination and the hard front combination are not assigned to a switch. In such a case, a user can change between two combinations of operating states using the user operating devices OP1 and OP2.

It is also acceptable to, for example, set the first user operating device OP1 to the independent mode and the second user operating device OP2 to the coordinated mode or to set the first user operating device OP1 to the coordinated mode and the second user operating device OP2 to the independent mode. Furthermore, it is acceptable to set the first left switch LSW1 of the first user operating device OP1 to the independent mode and the second left switch LSW2 to the coordinated mode or to set the first left switch LSW1 to the coordinated mode and the second left switch LSW2 to the independent mode. Similarly, it is acceptable to set the first right switch RSW1 of the second user operating device OP2 to the independent mode and the second right switch RSW2 to the coordinated mode or to set the first right switch RSW1 to the coordinated mode and the second right switch RSW2 to the independent mode.

If the control device 80 determines that Long Push Time Setting is selected in step P3 of FIG. 8, then the control device 80 proceeds from step P3 to step P13. In step P13, the control device 80 displays the long push time setting screen shown in FIG. 14 on the display unit 62. When the long push time setting is finished, the control device 80 proceeds to step P4. The long push time setting screen enables a minimum value of an amount of time used to detect a long push of a switch to be set. In this embodiment, as shown in FIG. 14, the long push time can be set to one of five values ranging from 300 ms to 700 ms and separated by intervals of 100 ms. FIG. 14 illustrates a case in which 600 ms is selected such that a long push is determined to have occurred when a switch is operated continuously for 600 ms or longer.

Figure 15:
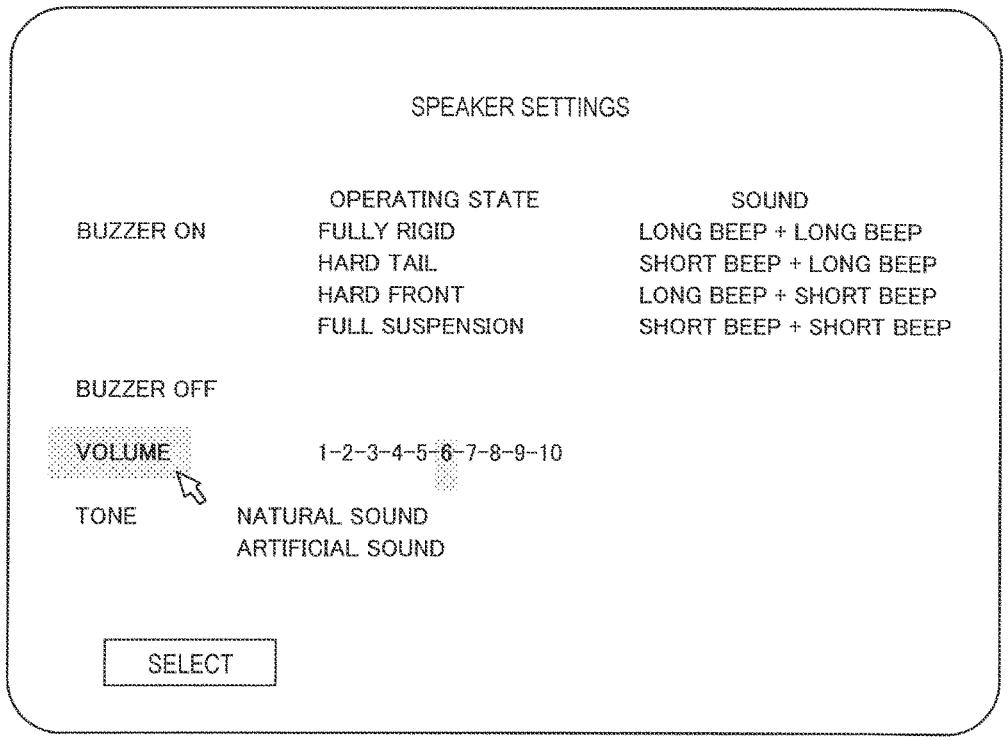
FIG. 15 is a schematic view of a speaker settings screen.

If the control device 80 determines that Speaker Settings has been selected in step P4 of FIG. 8, then the control device 80 proceeds from step P4 to step P14. In step P14, the control device 80 displays the speaker settings screen shown in FIG. 15 on the display unit 62. When the speaker settings are finished, the control device 80 proceeds to step P5. The speaker settings serve to notify a user of a set combination of suspension operating states with the speaker 88. For example, the speaker settings can be set such that a recognizable sound is emitted with respect to each of the fully rigid, hard tail, hard front, and full suspension combinations. With the speaker settings, a user can also select whether the speaker will be in an operating state (i.e., on) or a non-operating state (i.e., off). When the speaker is set to "On," a set sound is emitted from the speaker 88 when a switch corresponding to a particular suspension operation is operated or when the setting state of the suspension changes in response to the switch operation. Conversely, when the speaker is off, a sound is not emitted. The speaker settings allow a volume and a tone of the speaker 88 to be set.

Figure 16:
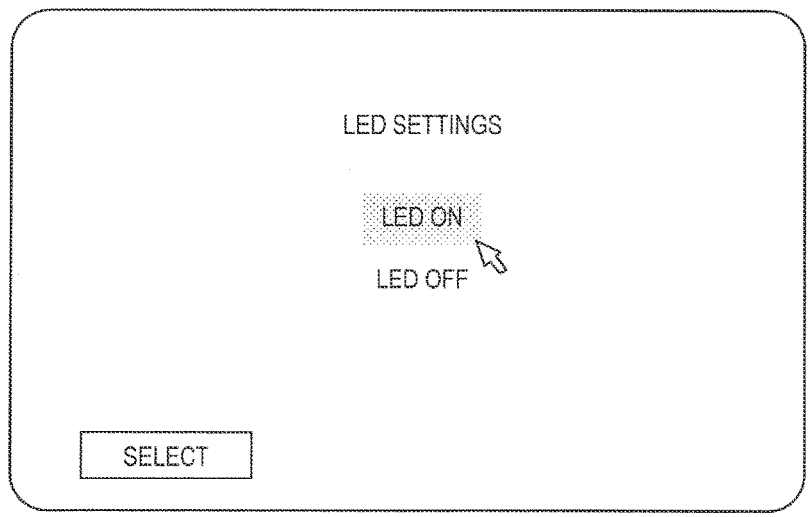
FIG. 16 is a schematic view of an LED settings screen.

If the control device 80 determines that Notification Settings has been selected in step P5 of FIG. 8, then the control device 80 proceeds from step P5 to step P15. In the step P15, the display unit 62 displays an LED setting screen as shown in FIG. 16. When the notification settings are finished, the control device 80 proceeds to step P6. The LED setting screen allows a user to turn the LEDs of the first notification unit 33 and the second notification unit 34 on and off. If the LEDs are set to "On," then the LEDs of the first notification unit 33 and the second notification unit 34 will turn on and off in response to the operating states of the front suspension FS and the rear suspension RS. More specifically, an LED of the first notification unit 33 illuminates when the rear suspension RS is in a locked state and turns off when the rear suspension RS is in a free state. Similarly, an LED of the second notification unit 34 illuminates when the front suspension FS is in a locked state and turns off when the front suspension FS is in a free state. Instead of turning off when the suspension is in a free state, it is also acceptable for a different color to illuminate than when the suspension is in a locked state. It is also acceptable to configure the indication settings such that an illumination time of the LEDs is set or such that such that the LEDs illuminate steadily or in a flashing manner depending on the operating state of the suspension. It is also acceptable to provide a setting for indicating a remaining battery capacity with the first notification unit 33 and the second notification unit 34.

Figure 17:
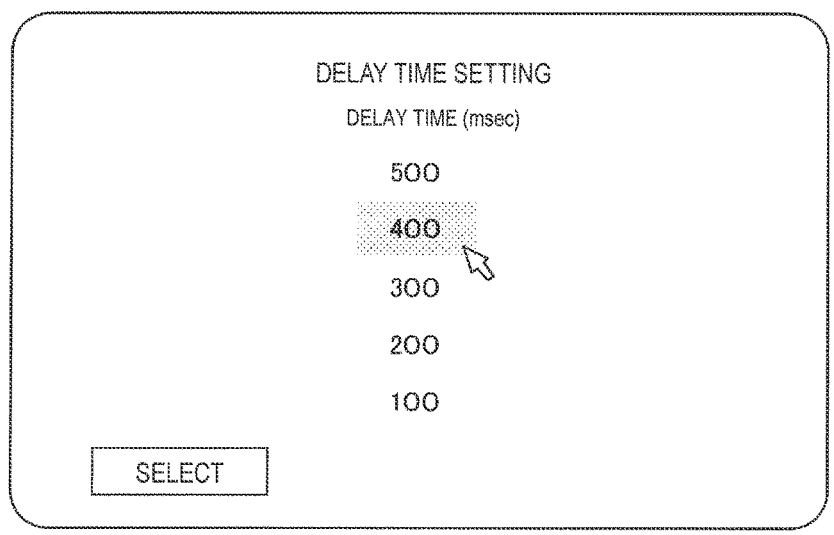
FIG. 17 is a schematic view of a delay time setting screen for setting a delay time (a prescribed time interval)

If the control device 80 determines that Delay Time Setting has been selected in step P6 of FIG. 8, then the control device 80 proceeds from step P6 to step P16. In the step P16, the display unit 62 displays an delay time setting screen as shown in FIG. 17. The delay time setting screen allows a user to set a delay time (a prescribed time interval) such that the front suspension FS and the rear suspension RS change operating states at different timings in the coordinated mode. The delay time (the prescribed time interval) is a time longer than a control cycle time of a microcomputer of the electric power supply controller 11. In this embodiment, as shown in FIG. 17, the delay time can be set to one of five values ranging from 100 ms to 500 ms and separated by intervals of 100 ms. FIG. 17 illustrates a case in which a delay time of 400 ms is selected. With this delay time setting, when a switch for changing the operating states of the front suspension FS and the rear suspension RS is operated, the timings at which the operating state of the front suspension FS and the operating of the rear suspension RS change are offset from each other by delay time of 400 ms. Although in this embodiment the delay time is on the order of hundreds of milliseconds, it is also acceptable to allow a user to select delay times longer than 500 ms up to, for example, several seconds (e.g., from 500 ms to 10 seconds).

The electric power supply controller 11 is an example of an electric component control unit 92. The electric power supply controller 11 has, for example, a microcomputer and the functional components of the electric power supply controller 11 are realized chiefly through software, as shown in FIG. 18. The electric power supply controller 11 has a gear change control section 93 and a suspension control section 95. The suspension control section 95 is an example of a suspension control device. The first switch unit 42 and the second switch unit 43 are connected to the electric power supply controller 11 by the electric power line communication. The rear derailleur 26r, the front derailleur 26f, the front suspension FS, the rear suspension RS, and the cycling computer 40 are also connected to the electric power supply controller 11 through electric power line communication. The electric power storage unit 12 is also electrically connected to the electric power supply controller 11.

The suspension control section 95 has a receiving part 96, a storage part 97, and a control part 98 as functional components. The receiving part 96 is configured to receive combination information indicating at least one combination of operating states from among combinations of an operating state of the front suspension FS and an operating state of the rear suspension RS set using the external device 60. The receiving part 96 is realized by, for example, including an electric power line connecting section 90a of the electric power line communication unit 90 and can be connected to the external device 60 through the adapter 94. The storage part 97 stores information indicating a combination of operating states received by the receiving part 96. The storage part 97 includes a non-volatile memory inside the suspension control section 95. The control part 98 is configured to control the front suspension FS and the rear suspension RS based on operating state combination information stored in the storage part 97 when the first user operating device OP1 and/or the second user operating device OP2 is operated.

Control operations executed by the suspension control section 95 will now be explained based on the flowcharts shown in FIGS. 19 to 21.

Figure 19:
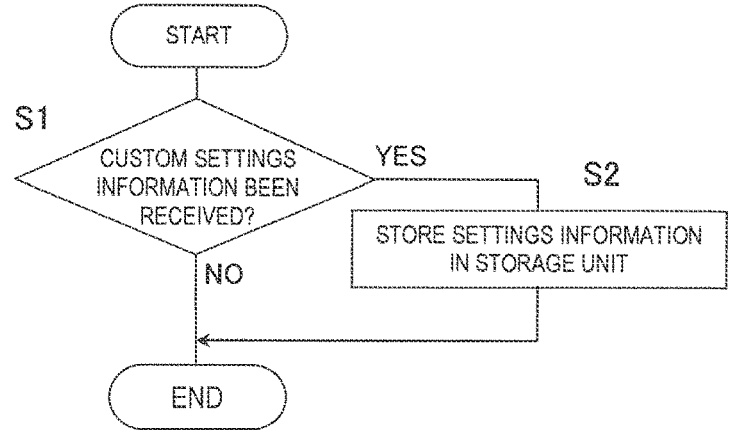
FIG. 19 is a flowchart showing control operations executed by the electric power supply controller when settings are received.

FIG. 19 is a flowchart showing control operations executed by the suspension control section 95 during custom settings. When the suspension control section 95 is connected to the external device 60 (i.e., the setting device in the illustrated embodiment), the suspension control section 95 starts the custom settings processing and proceeds to step S1. In step S1, the suspension control section 95 determines if setting information has been received from the external device 60. If setting information has been received, the suspension control section 95 proceeds from step S1 to step S2. In step S2, the suspension control section 95 stores the received setting information in the storage part 97 and ends the control sequence.

Figure 20:
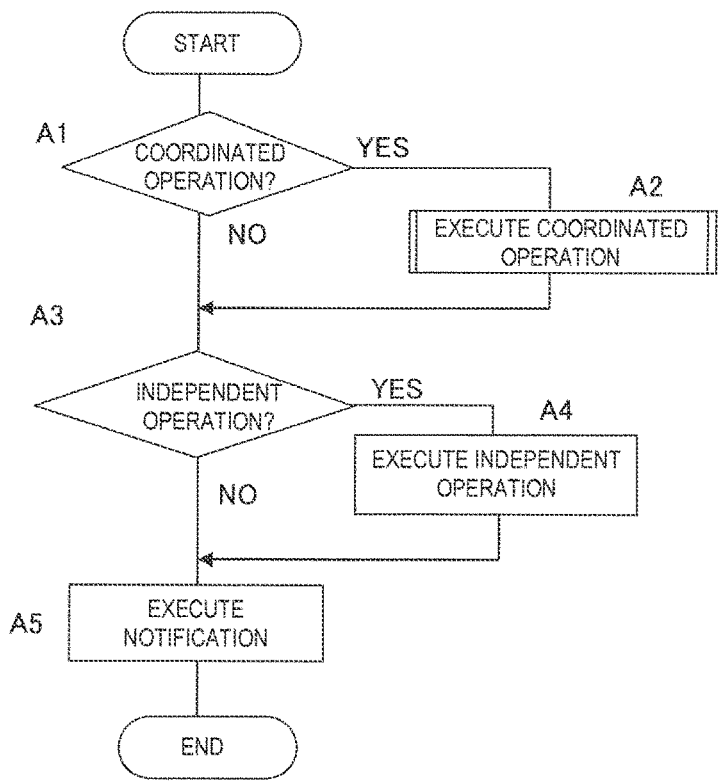
FIG. 20 is a flowchart showing normal control operations executed by the electric power supply controller.

FIG. 20 is a flowchart showing control operations executed by the suspension control section 95 during normal circumstances. After electric power is supplied to the suspension control section 95, the suspension control section 95 starts and proceeds to step A1 when a switch of one of the user operating devices OP1 and OP2 is operated. In step A1, the suspension control section 95 determines if the operated switch is a switch assigned to execute a coordinated operation. The suspension control section 95 then proceeds to step A2 if it determines in step A1 that the switch is assigned to execute a coordinated operation or proceeds to step A3 if it determines that the switch is not assigned to execute a coordinated operation. In step A3, the suspension control section 95 determines if the operated switch is a switch assigned to execute an independent operation. The suspension control section 95 then proceeds to step A4 if it determines in step A3 that the switch is assigned to execute an independent operation or proceeds to step A5 if it determines that the switch is not assigned to execute an independent operation.

In step A5, the suspension control section 95 issues a notification to at least one of the first notification unit 33, the second notification unit 34, and the cycling computer 40 based on the operating state assigned to the switch. The suspension control section 95 then proceeds to step A6 and ends the control sequence.

When the power supply is turned on, the suspension control section 95 sets the front suspension FS and the rear suspension RS to a predetermined default setting state. The default setting state is, for example, an operating state in which the front suspension FS and the rear suspension RS are both in a free state. It is also acceptable for the default setting state to be set in advance by the external device 60 (i.e., the setting device in the illustrated embodiment).

Figure 21:
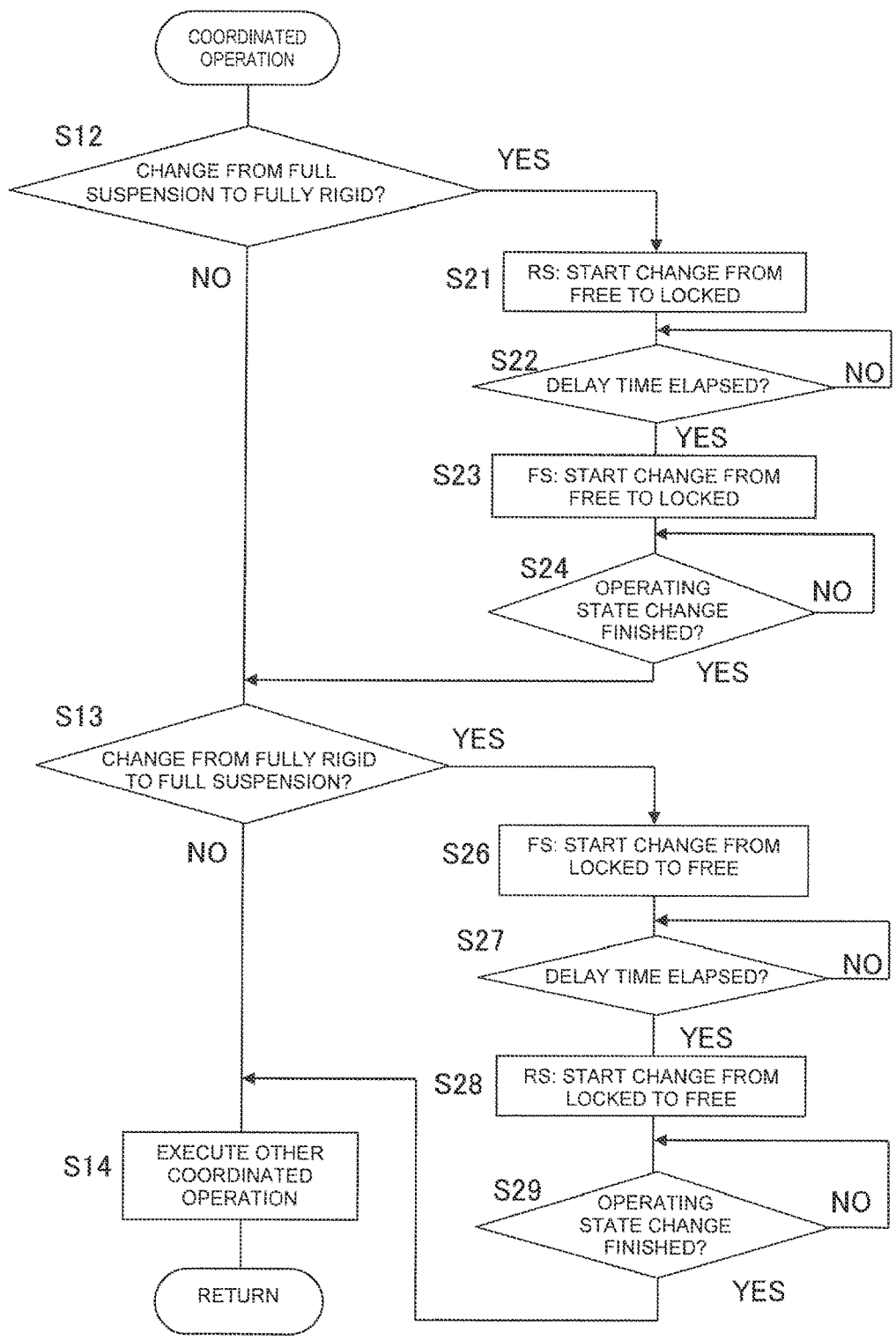
FIG. 21 is a flowchart showing steps executed by the electric power supply controller during a coordinated mode operation.

FIG. 21 is a flowchart showing steps executed to accomplish a coordinated operation. When it reaches step A2 of FIG. 20, the suspension control section 95 starts the control sequence shown in FIG. 21 and proceeds to step S12. In step S12, the suspension control section 95 determines if a change from the full suspension state to the fully rigid state has been selected by an operation of the first user operating device OP1 or the second user operating device OP2. In step S13, the suspension control section 95 determines if a change from the fully rigid state to the full suspension state has been selected. In step S14, the suspension control section 95 determines if an operation selecting another change has occurred, e.g., a change from the fully rigid state to the hard tail state or a change from the full suspension state to the hard tail state.

If it determines in step S12 that a change from the full suspension state to the fully rigid state has been selected, the suspension control section 95 proceeds from step S12 to step S21. In step S21, the suspension control section 95 starts changing the rear suspension RS from a free state to a locked state. In step S22, the suspension control section 95 waits for a delay time to elapse since it started changing the operating state of the rear suspension RS. The delay time is the delay time set in step P16 of FIG. 8. As explained previously, the delay time is an amount of time longer than a control cycle time and, in this embodiment, it is set to 400 ms. When the delay time has elapsed since the rear suspension RS started changing operating states, the suspension control section 95 proceeds to step S23. In step S23, the suspension control section 95 starts changing the front suspension FS from a free state to a locked state. In step S24, the suspension control section 95 waits for the operating states of the rear suspension RS and the front suspension FS to finish changing. When the operating states of the rear suspension RS and the front suspension FS have finished changing, the suspension control section 95 proceeds to step S13.

If it determines in step S13 that a change from the fully rigid state to the full suspension state has been selected, the suspension control section 95 proceeds from step S12 to step S21. In step S26, the suspension control section 95 starts changing the front suspension FS from a locked state to a free state. In step S27, the suspension control section 95 waits for a delay time to elapse since it started changing the operating state of the front suspension FS from the locked state to the free state. In this embodiment, the delay time is set to 500 ms. When the delay time has elapsed since the front suspension FS started changing operating states, the suspension control section 95 proceeds to step S28. In step S28, the suspension control section 95 starts changing the rear suspension RS from a locked state to a free state. In step S29, the suspension control section 95 waits for the operating states of the front suspension FS and the rear suspension RS to finish changing. When the operating states of the front suspension FS and the rear suspension RS have finished changing, the suspension control section 95 proceeds to step S14.

In independent operation control of step A4 of FIG. 20, the suspension control section 95 changes the operating states of the front suspension FS and the rear suspension RS individually in accordance with an operation of the first user operating device OP1 and the second user operating device OP2.

Figure 22:
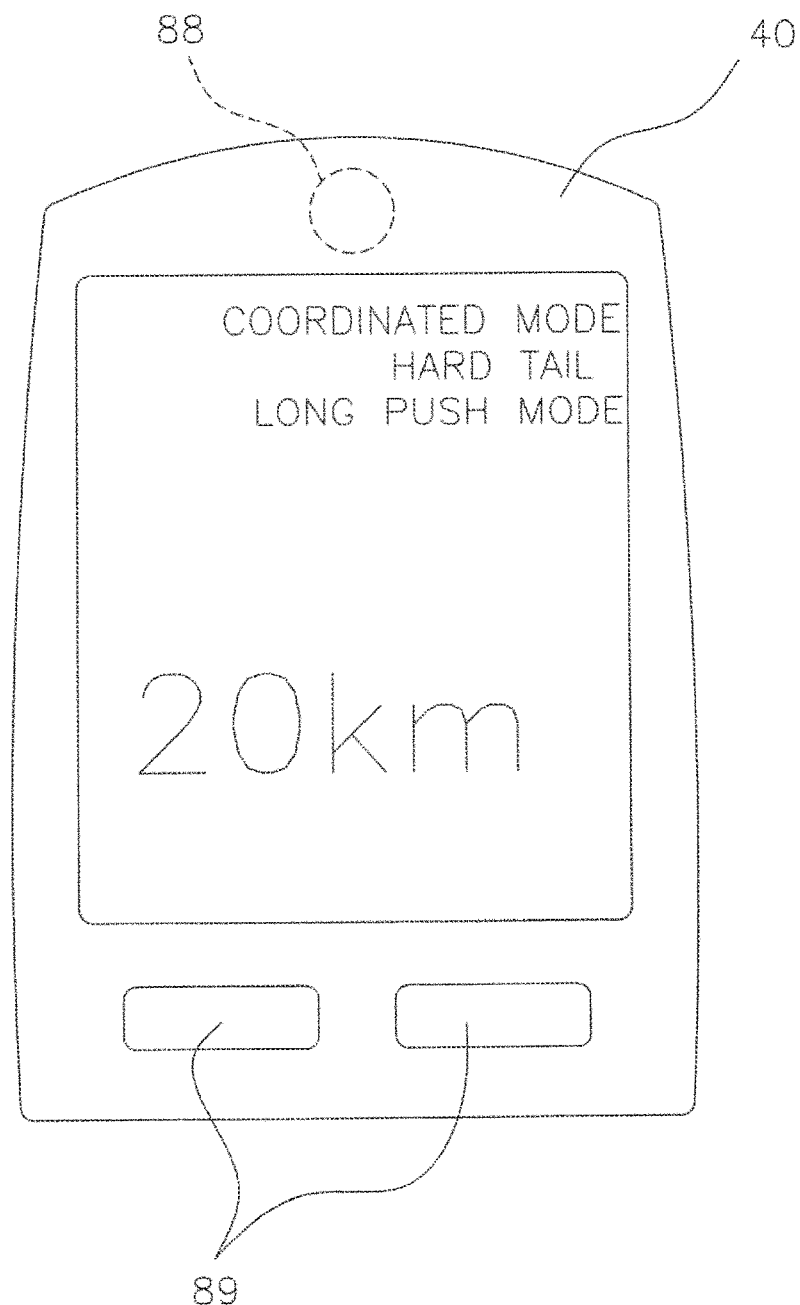
FIG. 22 is a screen shot showing an example of content displayed on a cycling computer display screen.

It is acceptable to configure the notification processing of step A5 of FIG. 20 to indicate a current operating state on the cycling computer 40 based on a setting state read from the storage part 97. It is also acceptable to indicate whether the long push mode or the standard mode is selected on the cycling computer 40. Furthermore, it is acceptable to indicate which of the four operating state combinations is selected as shown in FIG. 22 during the coordinated mode.

In this embodiment, the front suspension FS and the rear suspension RS can be controlled in a coordinated fashion based on combination information stored in the storage part 97. Consequently, the combination of operating states of the front suspension FS and the rear suspension RS can be changed by changing the combination information stored in the storage part 97. A combination information expresses a combination of an operating state of the front suspension FS and an operating state of the rear suspension RS. As a result, the combination of an operating state of the front suspension FS and an operating state of the rear suspension RS can be changed easily with an operation of the first operating device OP1 and the second operating device OP2.

The suspension control section 95 can control the front suspension FS and the rear suspension RS based on at least one set of combination information among four sets of combination information stipulating whether each of the front suspension FS and the rear suspension RS is in a locked state or a free state.

It is also possible to change the combination of operating states using combination information outputted from a computer or other external device 60. As a result, the control part 98 provided on the bicycle can be simplified.

While only selected embodiments have been chosen to illustrate the present invention, it will be apparent to those skilled in the art from this disclosure that various changes and modifications can be made herein without departing from the scope of the invention as defined in the appended claims. Components that are shown directly connected or contacting each other can have intermediate structures disposed between them unless otherwise specified. The functions of one element can be performed by two, and vice versa unless otherwise specified. The structures and functions of one embodiment can be adopted in another embodiment unless otherwise specified. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s).

(a) Although in the previously explained embodiment, the front derailleur and the rear derailleur are electrically driven and controlled, it is also acceptable for the derailleurs to be driven with a shift cable. In such a case, it is preferable for the second left switch LSW2 and the second right switch RSW2 to be arranged in a region D that is indicated with hatching in FIG. 3 and lies between a retraction lever 50a and a release lever 50b of a manually operated gearshift unit 50. More specifically, the second left switch LSW2 and the second right switch RSW2 are each arranged near a position where the operation range of the respective retraction lever 50a ends. As a result, the operating state of the suspension can be changed quickly immediately after a gear change operation.

Also, if the second left switch LSW2 and the second right switch RSW2 are arranged near and in front of the release levers 50b, then the operating state of the suspension can be changed immediately before a gear shift operation and a user can proceed directly to the gear shift operation after changing the operating state of the suspension. It is preferable to arrange the second left switch LSW2 and the second right switch RSW2 such that each is near a position where the operating range of the corresponding retraction lever 50a ends and near a position in just front of the corresponding release lever 50b such that both of the effects mentioned above can be realized.

Additionally, it is also possible to configure the apparatus such that the operating directions of the second left switch LSW2 and the second right switch RSW2 are different than the operating directions of the retraction levers 50a and the release levers 50b, e.g., perpendicular to the operating directions of the retraction levers 50a and the release levers 50b. In this way, accidental operation of the second left switch LSW2 and the second right switch RSW2 can be prevented.

(b) Mistaken operations of the rear suspension RS can be prevented by making one of the first left switch LSW1 and the second left switch LSW2 a dedicated switch for locking the rear suspension RS and making the other of the first left switch LSW1 and the second left switch LSW2 a dedicated switch for putting the rear suspension RS into a free state. Similarly, mistaken operations of the front suspension FS can be prevented by making one of the first right switch RSW1 and the second right switch RSW2 a dedicated switch for locking the front suspension FS and making the other of the first right switch RSW1 and the second right switch RSW2 a dedicated switch for putting the front suspension FS into a free state.

(c) In the previously explained embodiment, the switches LSW1 and LSW2 are provided for changing the operating state of the rear suspension RS and the switches RSW1 and RSW2 are provided for changing the operating state of the front suspension FS. However, it is also acceptable to provide one switch configured to change the operating state of the rear suspension RS from a locked state to a free state or from a free state to a locked state each time it is operated and one switch configured to change the operating state of the front suspension FS from a locked state to a free state or from a free state to a locked state each time it is operated.

(d) Although in the previously explained embodiment the operating devices (i.e., the first left switch LSW1, the second left switch LSW2, the first right switch RSW1, and the second right switch RSW2) and the controller (i.e., the electric power supply controller 11) are arranged to communicate by power line communication through a wired connection, the present invention is not limited to such an arrangement. For example, it is acceptable to provide normal power lines and communication lines separately and not use PLC communication. In such a case, the constituent features of each of the electric components can be simplified because it is not necessary to provide one control device to control each of the electric components and to provide a power line communication unit and an electric component control unit in each of the electric components. It is also acceptable if the electric components communicated wirelessly instead of through a wired connection. When the electric components communicate wirelessly, each of the electric components is provided with an electric power storage unit. With this configuration, the electric components can be installed on a bicycle more easily because it is not necessary to run wires between electric components.

(e) Although in the previously explained embodiment the various settings are made from an external device, it is acceptable to provide a control device on an electric component mounted to the bicycle such that the settings can be executed from the control device. For example, it is acceptable to configure the apparatus such that settings can be executed from an electric component control unit of one of the electric components. It is also acceptable to provide the function of the external device 60 in, for example, a cycling computer detachably mounted to the suspension system. In other words, the external device 60 can be realized with the cycling computer.

(f) Although in the previously explained embodiment the suspension is controlled by the electric power supply controller 11, the present invention is not limited to such an arrangement. The suspension can be controlled by an electric component control unit of any of the electric components. It is also acceptable to include an electric component control unit in the suspensions presented in the embodiment and constitute a suspension control device that includes this electric component control unit and the electric power supply controller 11.

(g) Although in the previously explained embodiment the operating devices can be selectively assigned to operate in independent mode or coordinated mode, the present invention is not limited to such an assignment scheme. For example, it is acceptable to transmit setting information for operating in the independent mode and setting information for operating in the coordinated mode from an external device to the operating devices and configure the apparatus such that the independent mode and the coordinated mode can be selected at an electric component control unit. For example, using the external device 60 as the setting device, setting information for operating in the independent mode is set from the setting screen shown in FIG. 10 and setting information for operating in the coordinated mode is set from the setting screen shown in FIG. 11. Similarly, information for operating in the independent mode and information for operating in the coordinated mode are set with respect to the long push mode. In such a case, it is acceptable, for example, to indicate the independent mode and the coordinated mode on the cycling computer 40 and to change settings by using the operating button 89 to select the independent mode or the coordinated mode from the cycling computer 40. Then, when each of the operating devices is operated, the suspension control section controls the suspensions based on the setting information corresponding to the selected mode, i.e., independent mode or coordinated mode.

(g) Although in the previously explained embodiment the operating devices can be selectively assigned to operate in a standard mode or a long push mode, the present invention is not limited to such an assignment scheme. For example, it is acceptable to transmit setting information for operating in the standard mode and setting information for operating in the long push mode from an external device to the operating devices and configure the apparatus such that the standard mode and the long push mode can be selected at an electric component control unit. For example, using the external device 60 as the setting device, setting information for operating in the standard mode is set from at least one of the setting screens shown in FIGS. 10 and 11, and setting information for operating in the long push mode is set from at least one of the setting screens shown in FIGS. 12 and 13. In such a case, it is acceptable, for example, to indicate the standard mode and the long push mode on the cycling computer 40 and to change settings by using the operating button 89 to select the standard mode or the long push mode from the cycling computer 40. Then, when each of the operating devices is operated, the suspension control section controls the suspensions based on the setting information corresponding to the selected mode, i.e., the standard mode or the long push mode.

Figure 23:
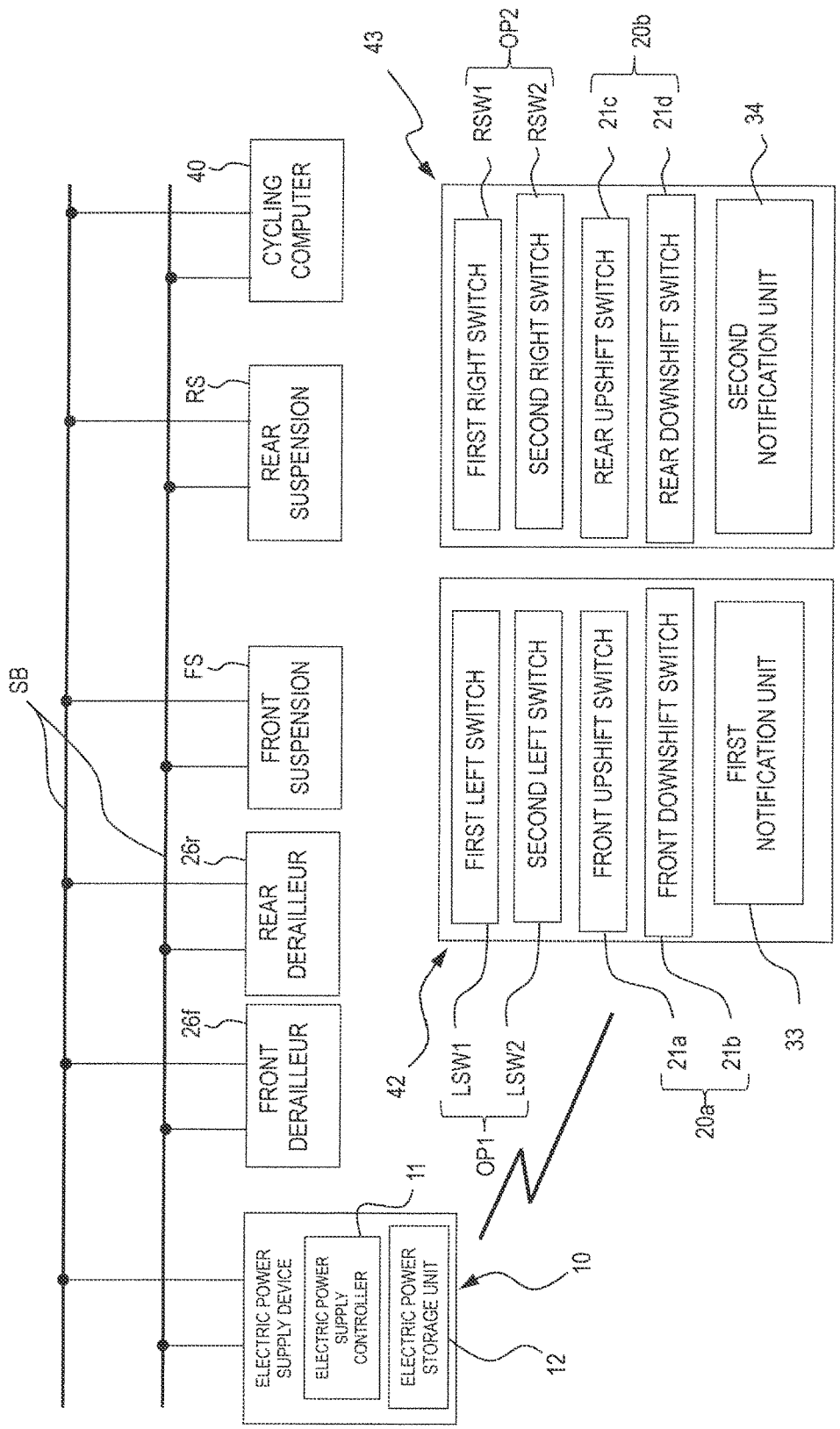
FIG. 23 is a block diagram, similar to FIG. 4, showing an electric component connection structure in accordance with another embodiment.

(h) Although in the previously explained embodiment the first operating device OP1 and the second operating device OP2 communicate with the electric power supply controller 11 (which has a control unit) by electric power line communication through wired connections, the present invention is not limited to such an arrangement. As shown in FIG. 23, an alternate embodiment is illustrated in which the bicycle suspension control apparatus is configured such that the first operating device OP1 and the second operating device OP2 communicate wirelessly with the control unit provided inside the electric power supply controller 11. In such a case, the wireless communication can be accomplished using such a wireless communication standard as, for example, IEEE 802.15 or IEEE 802.15.4.

(i) Although in the previously explained embodiment the electric power supply controller 11 and the external device 60 communicate with a wired connection through an adapter 94, the present invention is not limited to such a connection arrangement. It is acceptable for the electric power supply controller 11 and the external device 60 to be connected with wireless communication. In such a case, the wireless communication can be accomplished using such a wireless communication standard as, for example, IEEE 802.15 or IEEE 802.15.4.

(j) It is acceptable to configure the previously explained embodiment such that the electric component control units enter an energy conserving mode, i.e., a sleep mode, when the gear shifting units and operating devices have not been operated for a prescribed amount of time. A user can set an amount of time to serve as a reference for transitioning to the energy saving mode by using the selecting unit 61.

(k) Although in the previously explained embodiment a user selects coordinated operations one by one in order to assign a plurality of coordinated operations to one switch, it is also acceptable to, for example, prepare combinations of operating states in advance as coordinated operation patterns that can be assigned to a single switch. Examples of possible patterns include a first coordinated operation pattern comprising the fully rigid mode and the full suspension mode (two modes), a second coordinated operation pattern comprising the fully rigid mode, the hard tail mode, and the full suspension mode (three modes), a third coordinated operation pattern comprising the fully rigid mode, the hard front mode, and the full suspension mode (three modes), and a fourth coordinated operation pattern comprising the fully rigid mode, the hard tail mode, the hard front mode, and the full suspension mode (four modes). For example, the first to fourth coordinated operation patterns are displayed on a screen for setting the coordinated operation mode and a user can easily assign coordinated operations to one switch by selecting one of the modes using a selecting unit.

(l) Although in the previously explained embodiment there are two operating states of the suspension, namely a locked state and a free state, it is acceptable for the operating states of the suspension to include such aspects as a suspension height, a suspension stiffness, a suspension compression damping force, a suspension rebound damping force, and an damping force occurring when a rider pedals.

(m) Although in the previously explained embodiment the prescribed amount of time used to determine if a long push has occurred during long push mode is selected from among a plurality of predetermined times, it is acceptable to configure the apparatus such that a user can set a numerical value of the prescribed amount of time using the selecting unit 61.

(n) Although in the previously explained embodiment the delay time control section 86 is realized with software, it is acceptable for the delay time control section 86 to be realized with, for example, a piece of hardware configured to vary an operating state change of the suspension using a signal delaying device to delay a signal. A capacitor or other device can be used as the signal delaying device.

(o) It is acceptable to configure the apparatus such that when one of the two switches of the first operating device OP1 or the second operating device OP2 is assigned to change a suspension to a locked state, the other switch is automatically assigned to change the suspension to a free state or prohibited from being assigned to change the suspension to the locked state. If there are three or more switches, the apparatus can be configured to prohibit all of the switches from being assigned to the same operating state.

(p) Although the previously explained embodiment presents a case in which there are a first operating device OP1 and a second operating device OP2, it is acceptable for the apparatus to have only one operating device OP1 or OP2. In such a case, only information related to the one operating device is indicated on the display device 62.

(q) Although the previously explained embodiment presents a case in which there are a first operating device OP1 and a second operating device OP2, it is acceptable for the apparatus to be provided with only a single switch. In such a case, only information related to the switch is indicated on the display device 62.

(r) Although in the previously explained embodiment the order in which the operation states of the suspensions change is predetermined for Mode 1 and Mode 2, it is acceptable to configure the apparatus such that the order in which the operating states change can be changed using the setting device 60.

(s) Although in the previously explained embodiment the delay time is selected from a plurality of predetermined setting values, it is acceptable to configure the apparatus such that a user can set a numerical value of the delay time using the selecting unit 61.

(t) Although in the previously explained embodiment the setting information is transmitted to the suspension control section when it is determined that the Finalize button has been selected in step P7, it is also acceptable to configure the apparatus such that the setting information is transmitted to the suspension control section when the Select button of each setting screen is selected.

Thus, the foregoing descriptions of the embodiments according to the present invention are provided for illustration only, and not for the purpose of limiting the invention as defined by the appended claims and their equivalents.

What is claimed is:
1. A bicycle suspension control apparatus comprising:
a user operating device; and
a controller operatively coupled to the user operating device to selectively control a front bicycle suspension between a plurality of operating states and a rear bicycle suspension between a plurality of operating states, the controller being configured to selectively change the operating states of both of the front and rear bicycle suspensions to different ones of the operating states in response to a single user input, the controller including
a receiving part configured to connect to an external device to receive combination information indicating at least one combination of the operating states from among combinations of the operating states of the front and rear bicycle suspensions, the combination information including at least a combination information configured to set one of the front bicycle suspension and the rear bicycle suspension into a locked state for preventing expansion and contraction and to set another of the front bicycle suspension and the rear bicycle suspension into a free state for expanding and contracting;
a storage part that stores the combination information received by the receiving part; and
a control part that controls the front and rear bicycle suspensions based on the combination information stored in the storage part in response to the single user input of the user operating device.

2. The bicycle suspension control apparatus as recited in claim 1, wherein
the combination information in the storage part includes at least one of the following:
a first combination information configured to set the front and rear bicycle suspensions into the locked state;
a second combination information configured to set the front and rear bicycle suspensions into the free state;
a third combination information configured to set the front bicycle suspension into the free state and set the rear bicycle suspension into the locked state; and
a fourth combination information configured to set the front bicycle suspension into the locked state and set the rear bicycle suspension into the free state.

3. The bicycle suspension control apparatus as recited in claim 1, wherein
the receiving part includes a connecting port that is configured to be connected to an external device that outputs the combination information.

4. The bicycle suspension control apparatus as recited in claim 1, wherein
the user operating device includes at least one switch.

5. The bicycle suspension control apparatus as recited in claim 4, wherein
the combination information in the storage part includes a plurality of combinations of the operating states assigned to a single one of the at least one switch.

6. The bicycle suspension control apparatus as recited in claim 1, further comprising
a notification unit that reports an operating state of at least one of the front and rear bicycle suspensions.

7. The bicycle suspension control apparatus as recited in claim 1, wherein
the user operating device communicates with the control part through a wired connection.

8. The bicycle suspension control apparatus as recited in claim 1, wherein
the user operating device communicates with the control part through a wireless connection.

9. The bicycle suspension control apparatus as recited in claim 1, wherein
the control part is further configured to control the front and rear bicycle suspensions based on one of the combination information stored in the storage part in response to the single user input which is a first type of single user input of the user operating device, and the control part is further configured to control the front and rear bicycle suspensions based on an other one of the combination information, different from the one of the combination information, in response to the single user input which is a second type of single user input of the user operating device that is different from the first type of single user input.

10. The bicycle suspension control apparatus as recited in claim 9, wherein
the first type of single user input is an operation of the user operating device that occurs for a first length of time and the second type of single user input is an operation of the user operating device that occurs for a second length of time different from the first length of time.

11. The bicycle suspension control apparatus as recited in claim 9, wherein the controller part is further configured to sequentially select the combination information in a first sequential order in response to a sequence of occurrences of the first type of single user input, and the controller part is further configured to sequentially select the combination information in a second sequential order, different from the first sequential order, in response to a sequence of occurrences of the second type of single user input.

* * * * *